United States Patent [19]

Yamauchi et al.

[11] Patent Number: 5,613,109
[45] Date of Patent: Mar. 18, 1997

[54] SYSTEM FOR OUTPUTTING REPRODUCTION DATA BY JUDGING WHETHER A SECOND DATA GROUP IS OUTPUTTED AFTER FIRST DATA GROUP IS OUTPUTTED BY REPRODUCTION POINT DATA

[75] Inventors: Kazuhiko Yamauchi; Masayuki Kozuka, both of Neyagawa; Ryousuke Kobayashi, Tokyo, all of Japan; Stuart Donnelly, Edinburgh, United Kingdom

[73] Assignee: Mataushita Electric Industrial Co., Ltd., Osaka, Japan

[21] Appl. No.: 307,927

[22] Filed: Sep. 16, 1994

[30]     Foreign Application Priority Data

Sep. 20, 1993  [JP]  Japan ................................. 5-232905
Sep. 6, 1994   [JP]  Japan ................................. 6-212711

[51] Int. Cl.⁶ .............................. G06F 3/00; G06F 3/14
[52] U.S. Cl. ......................... 395/615; 395/118; 395/800; 364/251; 364/255.2; 364/261.3
[58] Field of Search ........................... 358/342; 260/260, 260/261.3, 262.4, 927.4, 958, 962, 974; 395/600, 650, 100, 375, 800; 364/251, 255.2, 261.3

[56]             References Cited

U.S. PATENT DOCUMENTS

| 4,318,173 | 3/1982  | Freedman et al. ............. 395/650 |
| 4,395,740 | 7/1983  | Yuen et al. ................... 360/72.2 |
| 4,497,023 | 1/1985  | Moorer ........................... 395/775 |
| 4,555,773 | 11/1985 | Karnes, Jr. et al. .......... 395/147 |
| 4,843,484 | 6/1989  | Kanamaru et al. ............ 358/324 |
| 4,905,094 | 2/1990  | Pocock et al. ................. 358/342 |
| 5,065,345 | 11/1991 | Knowles et al. .............. 395/154 |

(List continued on next page.)

FOREIGN PATENT DOCUMENTS

| 4600867 | 12/1991 | European Pat. Off. .. |
| 528425  | 2/1993  | European Pat. Off. .. |
| 627690  | 12/1994 | European Pat. Off. .. |

OTHER PUBLICATIONS

Robinson, P., Bringing Presentation to life on Mac., MacWEEK, vol. 6, No. 6, p. 39.

"Multimedia Applications and Database Requirements", by D. Woelk et al., IEEE Computer Society, Office Automation Symposium, Apr. 27–29, 1987.

"Architecture for Distributed Multimedia Database Systems", by P.b. Berra et al., Computer Communications, vol. 13, No. 4, May 1990.

Primary Examiner—Thomas C. Lee
Assistant Examiner—Anderson I. Chen
Attorney, Agent, or Firm—Price, Gess & Ubell

[57]             ABSTRACT

A data reproduction apparatus comprising: a storage unit for storing element data, and the management data including index data dividing the element data into first and second data groups and channel data indicating a first-data-group reproduction order; a management data readout and save unit for reading out and saving the management data; a first-data-group-readout first direction unit for outputting a first readout direction for the first-data-group element data as per the channel data; an input manipulation unit for accepting instruction input to select a reproduction channel of the first-data-group element data; a first-data-group-readout second direction unit for outputting a second readout direction for the first-data-group element data as per the channel data; a first-data-group readout unit for reading out the element data as per either the first or second readout direction; a first-data-group reproduction unit for converting the readout element data into reproduction data; a first-data-group output unit for converting the reproduction data into output data; a second-data-group output judgment unit for judging adequacy of the second-data-group element data output after the first-data-group element data; a second-data-group readout unit for reading out the second-data-group element data upon adequacy judgment; a second-data-group reproduction unit for converting the readout element data into reproduction data; and a second-data-group output unit for converting the reproduction data into output data.

25 Claims, 37 Drawing Sheets

U.S. PATENT DOCUMENTS

| | | | |
|---|---|---|---|
| 5,097,349 | 3/1992 | Nomura et al. | 358/335 |
| 5,200,943 | 4/1993 | Sano et al. | 369/48 |
| 5,208,679 | 5/1993 | Yamauchi et al. | 358/342 |
| 5,230,048 | 7/1993 | Moy | 395/600 |
| 5,265,248 | 11/1993 | Moulios et al. | 395/650 |
| 5,339,413 | 8/1994 | Koval et al. | 395/650 |
| 5,375,235 | 12/1990 | Berry et al. | 395/600 |
| 5,375,244 | 12/1994 | McNair | 395/726 |
| 5,423,035 | 6/1995 | DePrez | 395/600 |
| 5,440,677 | 8/1995 | Case et al. | 395/154 |
| 5,446,882 | 8/1995 | Capps et al. | 395/600 |
| 5,459,826 | 10/1995 | Archibald | 395/147 |
| 5,467,329 | 11/1995 | Hashimoto | 369/48 |
| 5,471,316 | 11/1995 | Sugawara et al. | 358/342 |
| 5,487,167 | 1/1996 | Dinallo et al. | 395/650 |

FIG. 4

INDEX DATA 31

| FIRST-DATA-GROUP CODE | ELEMENT DATA IDENTIFIER | ADDRESS VALUE |
|---|---|---|
| FIRST-DATA-GROUP CODE | ELEMENT DATA IDENTIFIER | ADDRESS VALUE |
| ... | ... | ... |
| SECOND-DATA-GROUP CODE | ELEMENT DATA IDENTIFIER | ADDRESS VALUE |
| SECOND-DATA-GROUP CODE | ELEMENT DATA IDENTIFIER | ADDRESS VALUE |
| SECOND-DATA-GROUP CODE | ELEMENT DATA IDENTIFIER | ADDRESS VALUE |
| SECOND-DATA-GROUP CODE | ELEMENT DATA IDENTIFIER | ADDRESS VALUE |
| ... | ... | ... |
| SECOND-DATA-GROUP CODE | ELEMENT DATA IDENTIFIER | ADDRESS VALUE |

FIG. 5

INDEX DATA (FIRST DATA GROUP) 51

| ELEMENT DATA IDENTIFIER | ADDRESS DATA |
|---|---|
| Y21 | ADDRESS VALUE |
| Y22 | ADDRESS VALUE |
| Y23 | ADDRESS VALUE |
| Y24 | ADDRESS VALUE |
| Y25 | ADDRESS VALUE |
| Y26 | ADDRESS VALUE |
| Y27 | ADDRESS VALUE |
| Y28 | ADDRESS VALUE |
| Y29 | ADDRESS VALUE |
| Y210 | ADDRESS VALUE |
| Y211 | ADDRESS VALUE |

INDEX DATA (SECOND DATA GROUP) 52

| ELEMENT DATA IDENTIFIER | ADDRESS DATA |
|---|---|
| K21 | ADDRESS VALUE |
| K22 | ADDRESS VALUE |
| K23 | ADDRESS VALUE |
| K24 | ADDRESS VALUE |
| K25 | ADDRESS VALUE |

FIG. 7

|  | REPRODUCTION ORDER DATA 66 |  |
|---|---|---|
| 75 |  | 46 |
| REPRODUCTION ORDER | ELEMENT DATA IDENTIFIER | 71 |
| REPRODUCTION ORDER | ELEMENT DATA IDENTIFIER | 72 |
| ⋮ | ⋮ | |
| REPRODUCTION ORDER | ELEMENT DATA IDENTIFIER | |
| LAST ORDER | ELEMENT DATA IDENTIFIER | |
|  | BRANCH JUDGEMENT DATA | 77 |

FIG. 8

BRANCH JUDGEMENT DATA 77

| REPRODUCTION ORDER IDENTIFIER | SCREEN AREA DATA | 81 |
| --- | --- | --- |
| REPRODUCTION ORDER IDENTIFIER | SCREEN AREA DATA | 82 |
| REPRODUCTION ORDER IDENTIFIER | SCREEN AREA DATA | 83 |
| REPRODUCTION ORDER IDENTIFIER | SCREEN AREA DATA | |
| ⋮ | ⋮ | |
| REPRODUCTION ORDER IDENTIFIER | SCREEN AREA DATA | |
| 65 | 85 | |

FIG. 9

CHANNEL DATA 91

| REPRODUCTION ORDER IDENTIFIER | REPRODUCTION ORDER DATA |
|---|---|
| P21 | S21 |
| P22 | S22 |
| P23 | S23 |
| P24 | S24 |

REPRODUCTION ORDER DATA S21

| REPRODUCTION ORDER | ELEMENT DATA IDENTIFIER |
|---|---|
| 1 | Y21 |
| 2 | Y22 BRANCH JUDGEMENT DATA B21 |

REPRODUCTION ORDER DATA S22

| REPRODUCTION ORDER | REPRODUCTION ORDER IDENTIFIER |
|---|---|
| 1 | Y23 |
| 2 | Y24 |
| 3 | Y25 |
| 4 | Y26 |

REPRODUCTION ORDER DATA S23

| REPRODUCTION ORDER | ELEMENT DATA IDENTIFIER |
|---|---|
| 1 | Y27 |
| 2 | Y28 |
| 3 | Y25 |
| 4 | Y26 |

REPRODUCTION ORDER DATA S24

| REPRODUCTION ORDER | ELEMENT DATA IDENTIFIER |
|---|---|
| 1 | Y210 |
| 2 | Y211 |
| 3 | Y25 |
| 4 | Y26 |

BRANCH JUDGEMENT DATA B21

| REPRODUCTION ORDER DATA | SCREEN AREA DATA |
|---|---|
| P22 | G21 |
| P23 | G22 |
| P24 | G23 |

FIG. 10

SECOND-DATA-GROUP
REPRODUCTION POINT DATA 33

| REPRODUCTION POINT IDENTIFIER | REPRODUCTION ORDER IDENTIFIER | LOCATION DATA |
|---|---|---|
| | | 101 |
| | | 102 |
| | | 103 |
| ... ... | ... ... | ... ... |
| 104 | 65 | 105 |

FIG. 11

SECOND-DATA-GROUP REPRODUCTION
POINT DATA110

| REPRODUCTION ORDER IDENTIFIER | LOCATION DATA | |
|---|---|---|
| P23 | 2 | ~111 |
| P24 | 2 | ~112 |

FIG. 19

INDEX DATA 181

| | | | | | | |
|---|---|---|---|---|---|---|
| FIRST-DATA-GROUP CODE | ELEMENT DATA IDENTIFIER | ADDRESS VALUE | ← 191 |
| FIRST-DATA-GROUP CODE | ELEMENT DATA IDENTIFIER | ADDRESS VALUE | ← 192 |
| ... | ... | ... | |
| FIRST-DATA-GROUP CODE | ELEMENT DATA IDENTIFIER | ADDRESS VALUE | ← 193 |
| SECOND-DATA-GROUP IDENTIFIER | ELEMENT DATA IDENTIFIER | ADDRESS VALUE | ← 194 |
| SECOND-DATA-GROUP IDENTIFIER | ELEMENT DATA IDENTIFIER | ADDRESS VALUE | ← 195 |
| SECOND-DATA-GROUP IDENTIFIER | ELEMENT DATA IDENTIFIER | ADDRESS VALUE | ← 196 |
| ... | ... | ... | |
| SECOND-DATA-GROUP IDENTIFIER | ELEMENT DATA IDENTIFIER | ADDRESS VALUE | |

| REPRODUCTION POINT IDENTIFIER | NUMBER OF REPRODUCTION TIMES | ~251 |
|---|---|---|
| REPRODUCTION POINT IDENTIFIER | NUMBER OF REPRODUCTION TIMES | ~252 |
| REPRODUCTION POINT IDENTIFIER | NUMBER OF REPRODUCTION TIMES | |
| ⋮ | ⋮ | |
| REPRODUCTION POINT IDENTIFIER | NUMBER OF REPRODUCTION TIMES | |

241

104   253

FIG. 31
EVALUATION FUNCTION DATA 301
| | | |
|---|---|---|
| 311 | EQUAL-PLUS-VALUE | $y = \alpha t + \beta$ |
| 312 | CONVERGE-PLUS-VALUE | $y = t^{1/\alpha} + \beta$ |
| 313 | EQUAL-MINUS-VALUE | $y = -(\alpha t + \beta)$ |
| 314 | CONVERGE-MINUS-VALUE | $y = -(t^{1/\alpha} + \beta)$ |
FIG. 32
EQUAL-PLUS-VALUE
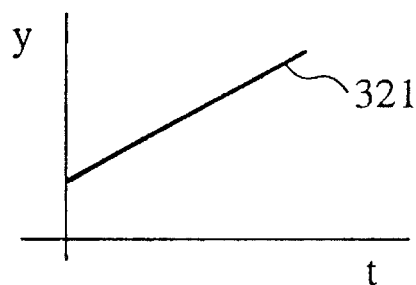
FIG. 33
CONVERGE-PLUS-VALUE
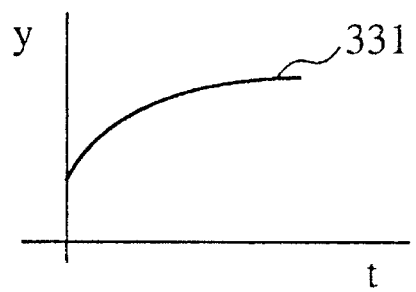

EQUAL-MINUS-VALUE

341

CONVERGE-MINUS-VALUE

| ELEMENT DATA | EVALUATION FUNCTION DATA |
|---|---|
| Y41 | $y = t + 10$ |
| Y42 | $y = t^{1/2}$ |
| Y43 | $y = t + 15$ |
| Y44 | $y = t + 15$ |
| Y45 | $y = t + 15$ |
| Y46 | $y = t + 15$ |
| Y47 | $y = t + 15$ |
| Y48 | $y = -(2t + 3)$ |
| Y49 | $y = t + 15$ |
| Y410 | $y = -t^{1/2}$ |

FIG. 38

| ELEMENT DATA | EVALUATION FUNCTION DATA | TIME(t) | EVALUATION VALUE(y) | TOTAL OF EVALUATION VALUES | REPRODUCTION OF SECOND DATA GROUP |
|---|---|---|---|---|---|
| Y41 | $y = t + 10$ | 10 | 20 | 20 | × |
| Y42 | $y = t^{1/2}$ | 25 | 5 | 25 | × |
| Y47 | $y = t + 15$ | 30 | 45 | 70 | × |
| Y48 | $y = -(2t + 3)$ | 10 | −23 | 47 | × |
| Y45 | $y = t + 15$ | 10 | 25 | 72 | × |
| Y46 | $y = t + 15$ | 15 | 30 | 102 | ○ |
| Y41 | $y = t + 10$ | 50 | 60 | 60 | × |
| Y42 | $y = t^{1/2}$ | 25 | 5 | 65 | × |
| Y43 | $y = t + 15$ | 10 | 25 | 90 | × |
| Y44 | $y = t + 15$ | 10 | 25 | 115 | ○ |

381

SYSTEM FOR OUTPUTTING REPRODUCTION DATA BY JUDGING WHETHER A SECOND DATA GROUP IS OUTPUTTED AFTER FIRST DATA GROUP IS OUTPUTTED BY REPRODUCTION POINT DATA

BACKGROUND OF THE INVENTION

1. Field of the Invention

The present invention relates to a data reproduction apparatus for successively reproducing a plurality of scene files composing stored data (including at least sound, still photographs, and texts) as per user's manipulation.

2. Description of the Related Art

Data reproduction apparatuses that reproduce digital data as per user's manipulation use a CD-ROM (Compact Disc Read Only Memory) as a data storage medium, which can store a broad range of media including sound, still photographs, moving pictures, texts, characters, program data, etc. Accordingly, applications such that handle the media stored in the CD-ROM as integrated data, or so-called multi-media applications, have been developed and are in practical use in the field of entertainment, presentation, and electronic books.

An electronic book application, one of the multi-media applications, has the same structure as a book in terms of the articles or the table of contents to reproduce books electronically from the digital data including at least three elements: sound, still photographs, and texts. Unlike a music application that reproduces stored data successively through a single channel (no branch channels exit in this application), the electronic application reproduces articles, which are the minimum units of data for reproduction, through a number of channels by means of an electronic book player (data reproduction apparatus). More precisely, the channels are selected by the user where the selection is possible, for example at the table of contents, and the data are reproduced through the selected channels.

The selection of the reproduction channel with the electronic book player will be explained with reference to FIG. 1, which schematically shows stored data having a plurality of reproduction channels (branches).

Once the reproduction operation starts, a scene file Y1 is reproduced first, and then a scene file Y2. Since scene files Y3, Y7, and Y10 are branched from the scene file Y2, the electronic book player waits for a branch command from the user to resume the reproduction of a specified scene file through branching. For example, when the scene file Y7 is specified, the scene files Y7, Y8, Y5 and Y6 are successively reproduced subsequent to the scene file Y2.

As the electronic book players have been used widely, there has been an increasing need for a technique to reproduce the secondary data while the primary data (scene files) are being reproduced; the secondary data referred herein are, for example, advertisement data, which are not directly related to the primary data.

Conventionally, the advertisement data are inserted into the scene files to be reproduced as an integral part thereof. For example, scene files Y4 and Y8 are advertisement data and inserted after scene files Y3 and Y7, respectively.

This means that the advertisement data are reproduced only when the user selects the reproduction channels including the advertisement data among a plurality of reproduction channels, and reproduction process has achieved at individual advertisement data. However, some reproduction channels are frequently reproduced and some are not depending on the user, making it difficult to ensure the same reproduction frequency for individual advertisement data.

For example, assume that the chances for the scene files Y3, Y7, and Y10 to be selected after the scene file Y2 are 1/7, 2/7, and 4/7 respectively, then the chances for the scene files Y4 and Y8 to be reproduced are 1/7 and 2/7 respectively.

Such irregular chances raise the problem of the advertisement rates: the advertisement rates can be set easily for paper media (magazines), but not for the electronic book application. To be more specific, paper media (magazines) contains various kinds of advertisements, and the advertisement rates generally vary depending on their location. Although the more frequently or less frequently turned pages depends on the reader, the reader generally turns the pages from front to back, and thus the publisher and advertiser can specify the most frequently turned pages relatively easy. Thus, the advertisement rates are directly proportional to pages' frequency to be turned: the rates are high if the advertisement is printed on more frequently turned pages such as the first page of the magazine, and low if printed on less frequently turned pages such as the pages around the middle.

In case of the electronic book application, however, having a plurality of reproduction channels makes it difficult to specify more frequently turned pages, and hence to set the rates. For this reason, neither the publisher nor the advertiser benefits as they do with the magazines by inserting the advertisements in the electronic book application.

SUMMARY OF THE INVENTION

Accordingly, the present invention has a first object to provide a data reproduction apparatus for reproducing a plurality of element data of a second data group at an equal frequency while data element of a first data group having a plurality of reproduction channels are being reproduced.

The present invention has a second object to provide a data reproduction apparatus for selectively reproducing the element data of the second data group depending on the contents thereof while the element data of the first data group having a plurality of reproduction channels are being reproduced.

The present invention has a third object to provide a data reproduction apparatus for reproducing a specified number of the element data of the second group while the element data of the first data group having a plurality of reproduction channels are being reproduced.

The present invention has a fourth object to provide a data reproduction apparatus for reproducing the element data of the second group by adjusting their reproduction frequency while the element data of the first data group having a plurality of reproduction channels are being reproduced.

The first object can be fulfilled by a data reproduction apparatus comprising: a storage unit for storing primary data and management data, the primary data being a plurality of element data, the management data including index data that divide the plurality of element data into a first data group and a second data group, and channel data that indicate a reproduction order in the first data group; a management data readout and save unit for reading out and saving the index data and the channel data from the storage unit; a first-data-group-readout first direction unit for outputting a first readout direction to readout the element data of the first data group as per the channel data saved in the management data readout and save unit; an input manipulation unit for accepting instruction input for directing a selection of a reproduction channel of the element data of the first data group; a first-data-group-readout second direction unit for outputting a second readout direction to readout the element data of the first data group from the storage unit as per the channel data specified by the instruction input from the input manipulation unit; a first-data-group readout unit for reading out the element data stored in the storage unit as per one of the first and second readout direction; a first-data-group reproduction unit for converting the element data readout by the first-data-group readout unit into reproduction data and outputting resulting reproduction data; a first-data-group output unit for converting the reproduction data inputted from the first-data-group reproduction unit into output data and outputting resulting output data; a second-data-group output judgment unit for judging whether it is adequate to output the element data of the second data group after the element data of the first data group being reproduced; a second-data-group readout unit for reading out the element data of the second data group stored in the storage unit when the second-data-group output judgment unit judges adequacy of the output of the element data of the second data group; a second-data-group reproduction unit for converting the element data read out by the second-data-group readout unit into reproduction data and outputting resulting reproduction data; and a second-data-group output unit for converting the reproduction data inputted from the second-data-group reproduction unit into output data and outputting resulting output data.

According to the above construction, the reproduction of the element data of the second data group can be ensured without depending on the reproduction channels or branched element data of the first data group.

The storage unit may further store second-data-group reproduction point group data, the second-data-group reproduction point group data being management data for directing reproduction of the element data of the second data group within a reproduction channel of the element data of the first data group being reproduced, and the management data readout and save unit may further read out and save the second-data-group reproduction point group data stored in the storage unit, and the second-data-group output judgment unit may judge adequacy when the element data from the first-data-group output unit coincide with the second-data-group reproduction point group data saved in the management data readout and save unit.

The data reproduction apparatus may further comprise: a second-data-group reproduction history record unit for recording the element data outputted from the second-data-group output unit by means of an identifier identifying individual element data; and a second-data-group selection unit for firstly selecting the element data of the second data group whose identifier does not coincide with the identifiers stored in the second-data-group reproduction history record unit, and the second-data-group readout unit may read out the element data selected by the second-data-group selection unit from the storage unit.

The index data may include an element data identifier identifying individual element data and an address value identifying a place in the storage unit where each element data specified by a respective element data identifier are stored, and the channel data may include reproduction order data formed of a reproduction order and an element data identifier, and a reproduction order identifier identifying individual reproduction order data, and the first-data-group-readout first direction unit may include: a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by the first address value extraction unit to the first-data-group readout unit, and the first-data-group-readout second direction unit may include: a second address value extraction unit for extracting the address value from the index data by referring to the reproduction order in the reproduction order data in the channel data and finding the element data identifier in the index data that coincides with the element data identifier in the reproduction order data, the address value extracted by the first address value extraction unit being different from the address value extracted by the second address value extraction unit; and a second address indication unit for outputting the address value extracted by the second address value extraction unit to the first-data-group readout unit.

The input manipulation unit may accept instruction input as to a reproduction channel by means of a location coordinate, and branch judgment data may be attached to the element data identifier in the reproduction order data when the reproduction order corresponding to the element data identifier is placed last in the order and a reproduction channel for the element data identified by the element data identifier has a branching point at an end thereof, and the branch judgment data may include a reproduction order identifier, and screen area data consisting of location coordinates each indicating respective locations of a plurality of video data areas, each of the plurality of video data areas corresponding to the respective reproduction order identifiers, and the first-data-group readout unit may include: a branched channel judgment unit for judging within of which the screen area data the location coordinate accepted by the input manipulation unit exist; a reproduction channel determination unit for determining a reproduction channel as per the reproduction order data identified by the reproduction order identifier corresponding to the screen area data judged by the branched channel judgment unit; a third address value extraction unit for extracting the address value from the index data by referring to the reproduction order in the reproduction order data in the channel data and finding the element data identifier in the index data that coincides with the element data identifier in the reproduction order data, the address values extracted respectively by the first, second, and third address value extraction units being different; and an element data readout unit for reading out the element data from the storage unit using the address value extracted by the third address value extraction unit.

The second-data-group reproduction point group data may include a reproduction order identifier and location data representing a reproduction order for each reproduction point forming a reproduction group, and the second-data-group output judgment unit may include: a reproduction point judgment unit for judging whether the reproduction order identifier and the reproduction order of the element data outputted from the first-data-group output unit coincide with the reproduction order identifier and the corresponding location data of any of the second-data-group reproduction point group data respectively; and a second-data-group-readout direction unit for outputting a direction to the second-data-group readout unit to read out the element data based on judgment of element-data-identifier-coincidence by the reproduction point judgment unit.

The index data may further include a code identifier identifying one of the first data group and the second data group, and the second-data-group selection unit may include: a not-reproduced-yet element data extraction unit for extracting the element data whose element data identifier does not correspond to the element data identifiers recorded in the second-data-group reproduction history data record unit out of element data whose element data identifiers correspond to the code identifier identifying the second data group; a random selection unit for selecting one element data from a plurality of element data extracted by the not-reproduced-yet element data extraction unit at random; a fourth address value extraction unit for extracting the address value from the index data by referring to the reproduction order in the reproduction order data in the channel data and finding the element data identifier in the index data that coincides with the element data identifier in the reproduction order data, the address values extracted respectively by the first, second, third, and fourth address value extraction units being different; and a third address direction unit for outputting the address value extracted by the fourth address value extraction unit to the second-data-group readout unit.

The element data of the first data group may be scene files of electronic book data, and the element data of the second data group may be advertisement data, the advertisement data being reproduced within a reproduction channel of the scene files.

According to the above construction, assuming that articles (scene files) of the electronic book are the element data of the first data group having a plurality of reproduction channels, and advertisement data having no reproduction channels are the element data of the second data group, then each advertisement can be reproduced at an equal frequency without depending on the reproduction channels of the articles.

Also, the reproduction point of the element data of the second data group can be set at any arbitrary point in the reproduction channels of the data element of the first data group. Thus, the editor of the electronic book can place the advertisement in such a way that the user can see the advertisement and the articles continuously.

To fulfill the second object, the storage unit may further store second-data-group reproduction point group data and data-group specifying data, the second-data-group reproduction point group data being management data for directing reproduction of the element data of second data group within a reproduction channel of the element data of the first data group being reproduced, the data-group specifying data specifying the element data of the second data group to be reproduced at a reproduction point as per certain classification, and the management data readout and save unit may further read out and save the second-data-group reproduction point group data and data-group specifying data stored in the storage unit, and the second-data-group output judgment unit may judge adequacy when the element data outputted from the first-data-group output unit coincide with the second-data-group reproduction point group data saved in the management data readout and save unit, and the second-data-group readout unit may read out the element data of the second data group stored in the storage unit as per the data-group specifying data upon adequacy judgment by the second-data-group output judgment unit.

According to the above construction, the kind of the element data of the second data group can be specified for individual reproduction channels of the element data of the first data group.

Also, the index data may include an element data identifier identifying individual element data and an address value identifying a place in the storage unit where each element data specified by a respective element data identifier are stored, and the channel data may include reproduction order data formed of a reproduction order and an element data identifier, and a reproduction order identifier identifying individual reproduction order data, and the first-data-group-readout first direction unit may include: a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by the first address value extraction unit to the first-data-group readout unit, and the first-data-group-readout second direction unit may include: a second address value extraction unit for extracting the address value from the index data by referring to the reproduction order in the reproduction order data in the channel data and finding the element data identifier in the index data that coincides with the element data identifier in the reproduction order data, the address value extracted by the first address value extraction unit being different from the address value extracted by the second address value extraction unit; and a second address indication unit for outputting the address value extracted by the second address value extraction unit to the first-data-group readout unit.

The input manipulation unit may accept instruction input as to a reproduction channel by means of a location coordinate, and branch judgment data may be attached to the element data identifier in the reproduction order data when the reproduction order corresponding to the element data identifier is placed last in the order and a reproduction channel for the element data identified by the element data identifier has a branching point at an end thereof, and the branch judgment data may include a reproduction order identifier, and screen area data consisting of location coordinates each indicating respective locations of a plurality of video data areas, each of the plurality of video data areas corresponding to the respective reproduction order identifiers, and the first-data-group readout unit may include: a branched channel judgment unit for judging within of which the screen area data the location coordinate accepted by the input manipulation unit exist; a reproduction channel determination unit for determining a reproduction channel as per the reproduction order data identified by the reproduction order identifier corresponding to the screen area data judged by the branched channel judgment unit; a third address value extraction unit for extracting the address value from the index data by referring to the reproduction order in the reproduction order data in the channel data and finding the element data identifier in the index data that coincides with the element data identifier in the reproduction order data, the address values extracted respectively by the first, second, and third address value extraction units being different; and an element data readout unit for reading out the element data from the storage unit using the address value extracted by the third address value extraction unit.

The storage unit may further store a second-data-group identifier that divides the element data of the second data group by certain classification, and the second-data-group reproduction point group data may include a reproduction point identifier, a reproduction order identifier, and location data representing a reproduction order for each reproduction point, and the data-group specifying data may include a reproduction point identifier and a corresponding second data group identifier, and the second-data-group output judgment unit may include: a reproduction point judgment unit for judging whether the reproduction order identifier and the reproduction order of the element data outputted from the first-data-group output unit coincide with the reproduction order identifier and the location data of any of the second-data-group reproduction point group data respectively, and the second-data-group readout unit may include: a second-data-group reproduction-point-identifier extraction unit for extracting a reproduction point identifier coinciding with the second-data-group reproduction point group data when the reproduction point judgment unit judges coincidence; a second-data-group element data identifier selection unit for taking out the second data group identifier corresponding to the reproduction point identifier extracted by the second-data-group reproduction-point-identifier extraction unit to select an element data identifier having the second data group identifier in the index data; a second-data-group random selection unit for selecting one element data identifier from the element data identifiers selected by the second-data-group element data identifier selection unit; a fourth address value extraction unit for extracting the address value corresponding to the element data identifier selected by the second-data-group random selection unit from the index data; and a second-data-group readout unit for reading out the element data stored in the storage unit by accessing to an "address identified by the address value extracted by the fourth address value extraction unit.

The element data of the first data group may be scene files of electronic book data, and the element data of the second data group may be advertisement data, the advertisement data being reproduced within a reproduction channel of the scene files.

According to the above construction, a specific advertisement can be reproduced for specific articles (scene files) being reproduced.

To fulfill the third objects, the management data may further include second-data-group reproduction point group data and selection condition data, the second-data-group reproduction point group data indicating reproduction of element data of the second data group within a reproduction channel of the element data of the first data group; and the management data readout and save unit may further read out and save the second-data group reproduction point group data and the selection condition data stored in the storage unit, whereby the second-data-group output judgment unit judges adequacy when the element data outputted from the first-data-group output unit coincide with the element data saved in the management data readout and save unit.

The data reproduction apparatus may further comprise second-data-group selection unit for selecting the element data as per the selection condition data, the selection condition data being the number of the element data to be read out, and the second-data-group readout unit may read out the element data selected by the second-data-group selection unit from the storage unit.

The index data may include an element data identifier identifying individual element data and an address value identifying a place in the storage unit where each element data specified by a respective element data identifier are stored, and the channel data may include reproduction order data formed of a reproduction order and an element data identifier, and a reproduction order identifier identifying individual reproduction order data, and the first-data-group-readout first direction unit may include: a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by the first address value extraction unit to the first-data-group readout unit, and the first-data-group-readout second direction unit may include: a second address value extraction unit for extracting the address value from the index data by referring to the reproduction order in the reproduction order data in the channel data and finding the element data identifier in the index data that coincides with the element data identifier in the reproduction order data, the address value extracted by the first address value extraction unit being different from the address value extracted by the second address value extraction unit; and a second address indication unit for outputting the address value extracted by the second address value extraction unit to the first-data-group readout unit.

The input manipulation unit may accept instruction input as to a reproduction channel by means of a location coordinate, and branch judgment data may be attached to the element data identifier in the reproduction order data when the reproduction order corresponding to the element data identifier is placed last in the order and a reproduction channel for the element data identified by the element data identifier has a branching point at an end thereof, and the branch judgment data may include a reproduction order identifier, and screen area data consisting of location coordinates each indicating respective locations of a plurality of video data areas, each of the plurality of video data areas corresponding to the respective reproduction order identifiers, and the first-data-group readout unit may include: a branched channel judgment unit for judging within of which the screen area data the location coordinate accepted by the input manipulation unit exist; a reproduction channel determination unit for determining a reproduction channel as per the reproduction order data identified by the reproduction order identifier corresponding to the screen area data judged by the branched channel judgment unit; a third address value extraction unit for extracting the address value from the index data by referring to the reproduction order in the reproduction order data in the channel data and finding the element data identifier in the index data that coincides with the element data identifier in the reproduction order data, the address values extracted respectively by the first, second, and third address value extraction units being different; and an element data readout unit for reading out the element data from the Storage unit using the address value extracted by the third address value extraction unit.

The second-data-group reproduction point group data may include a reproduction point identifier, a reproduction order identifier, and location data representing a reproduction order, and the selection condition data may include a reproduction point identifier and the number of element data to be reproduced for individual reproduction point identifiers, and the second-data-group output judgment unit may include: a reproduction point judgment unit for judging whether the reproduction order identifier and the reproduction order of the element data outputted form the first data group output unit coincide with the reproduction order identifier and the location data of any of the second-data-group reproduction point data respectively, and the second-data-group readout unit may include: a second-data-group reproduction-point-identifier extraction unit for extracting the reproduction point identifier coinciding with the seconddata-group reproduction data when the reproduction point judgment unit judges coincidence; a second-data-group reproduction number extraction unit for taking out the number of element data to be reproduced corresponding to the reproduction point identifier extracted by the second-data-group reproduction-point-identifier extraction unit from the selection condition data; a second-data-group element data identifier random selection unit for selecting a number of element data identifiers of the element data of the second data group in the index data at random, the number matching with the number of element data to be reproduced extracted by the second-data-group reproduction number extraction unit; a fourth address value extraction unit for successively extracting the address values corresponding to the element data identifiers of the second data group selected by the second-data-group element data identifier random selection unit from the index data, the address values extracted respectively by the first, second, third, and fourth address values extraction units being different, and a second-data-group readout unit for successively reading out the element data stored in the storage unit by accessing to addresses identified by the address values extracted by the fourth address value extraction unit.

The element data of the first data group may be scene files of electronic book data, and the element data of the second data group may be advertisement data, the advertisement data being reproduced within a reproduction channel of the scene files.

According to the above construction, the number of the element data of the second data group to be reproduced can be specified for individual reproduction points.

To fulfill the fourth embodiment, the storage unit may further store evaluation function data for individual element data of the first data group, and the data reproduction apparatus may further comprise: an evaluation function data readout and save unit for reading and saving the evaluation function data stored in the storage unit as per one of the first and second readout direction; and a reproduction state detection unit for detecting a reproduction time, the reproduction time being a period of time from a start to an end of reproduction for individual element data at the first data group output unit; an evaluation value computation unit for computing an evaluation value by substituting the reproduction time into the evaluation function data saved in the evaluation function data readout and save unit; an evaluation value addition unit for computing a total of the evaluation values computed by the evaluation value computation unit, whereby the second-data-group output judgment unit judges adequacy when the total of the evaluation values becomes greater than a predetermined threshold; and a reset unit for resetting the total of the evaluation values computed by the evaluation value addition unit when the second-data-group output unit outputs output data.

According to the above construction, the reproduction frequency of the element data of the second data group can be adjusted according to the reproduction state of the element data of the first data group and the reproduction time.

Also, the data reproduction apparatus may further comprise: a reproduction suspend/resume manipulation unit for accepting a manipulation to suspend output of the output data from the first-data-group output unit and outputting an output suspend command to the first-data-group output unit, and for accepting a manipulation to release the output-data output suspension and outputting an output resume command to the first-data-group output unit, and the reproduction state detection unit may detect the reproduction time by including a time interval for the output suspension caused by the reproduction suspend/resume manipulation.

The index data may include an element data identifier identifying individual element data and an address value identifying a place in the storage unit where each element data specified by a respective element data identifier are stored, and the channel data may include reproduction order data formed of a reproduction order and an element data identifier, and a reproduction order identifier identifying individual reproduction order data, and the first-data-group-readout first direction unit may include: a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by the first address value extraction unit to the first-data-group readout unit, and the first-data-group-readout second direction unit may include: a second address value extraction unit for extracting the address value from the index data by referring to the reproduction order in the reproduction order data in the channel data and finding the element data identifier in the index data that coincides with the element data identifier in the reproduction order data, the address value extracted by the first address value extraction unit being different from the address value extracted by the second address value extraction unit; and a second address indication unit for outputting the address value extracted by the second address value extraction unit to the first-data-group readout unit.

The input manipulation unit may accept instruction input as to a reproduction channel by means of a location coordinate, and branch judgment data may be attached to the element data identifier in the reproduction order data when the reproduction order corresponding to the element data identifier is placed last in the order and a reproduction channel for the element data identified by the element data identifier has a branching point at an end thereof, and the branch judgment data may include a reproduction order identifier, and screen area data consisting of location coordinates each indicating respective locations of a plurality of video data areas, each of the plurality of video data areas corresponding to the respective reproduction order identifiers, and the first-data-group readout unit may include: a branched channel judgment unit for judging within of which the screen area data the location coordinate accepted by the input manipulation unit exist; a reproduction channel determination unit for determining a reproduction channel as per the reproduction order data identified by the reproduction order identifier corresponding to the screen area data judged by the branched channel judgment unit; a third address value extraction unit for extracting the address value from the index data by referring to the reproduction order in the reproduction order data in the channel data and finding the element data identifier in the index data that coincides with the element data identifier in the reproduction order data, the address values extracted respectively by the first, second, and third address value extraction units being different; and an element data readout unit for reading out the element data from the storage unit using the address value extracted by the third address value extraction unit.

The evaluation function data may be selected from a group consisting of an equal-plus-value evaluation function, a converge-plus-value evaluation function, an equal-minus-value evaluation function, and a converge-minus-value evaluation function depending on a content of corresponding element data.

The element data of the first data group may be scene files of electronic book data, and the element data of the second data group may be advertisement data, the advertisement data being reproduced within a reproduction channel of the scene files.

According to the above construction, the reproduction frequency of the advertisement data can be selected depending on the contents of the scene files being reproduced.

BRIEF DESCRIPTION OF THE DRAWINGS

These and other objects, advantages and features of the invention will become apparent from the following description thereof taken in conjunction with the accompanying drawings which illustrate specific embodiments of the invention. In the drawings:

FIG. 4 is a view showing index data in the first embodiment;

FIG. 5 is a view showing the index data in the first embodiment more in detail;

FIG. 7 is a view showing a structure of reproduction order data in the first embodiment;

FIG. 8 is a view showing a structure of branch judgment data in the first embodiment;

FIG. 9 is a view showing the channel data in the first embodiment more in detail;

FIG. 10 is a view showing a structure of a second-data-group reproduction point data in the first embodiment;

FIG. 11 is a view showing a detailed structure of the second-data-group reproduction point data in the first embodiment;

FIG. 19 is a view showing a structure of index data of the second embodiment;

FIG. 25 is a view showing selection condition data in the third embodiment;

FIG. 31 is a view explaining evaluation function data in the fourth embodiment;

FIG. 32 is a graph showing an equal-plus-value evaluation function in the fourth embodiment;

FIG. 33 is a graph showing a converge-plus-value evaluation function in the fourth embodiment;

FIG. 37 is a view explaining the evaluation function data in the fourth embodiment;

FIG. 38 is a view showing an evaluation on the element data using the evaluation function data;

DESCRIPTION OF THE PREFERRED EMBODIMENTS

In the following, data reproduction apparatus in accordance with four embodiments of the present invention will be explained.

FIRST EMBODIMENT

Figure 1:
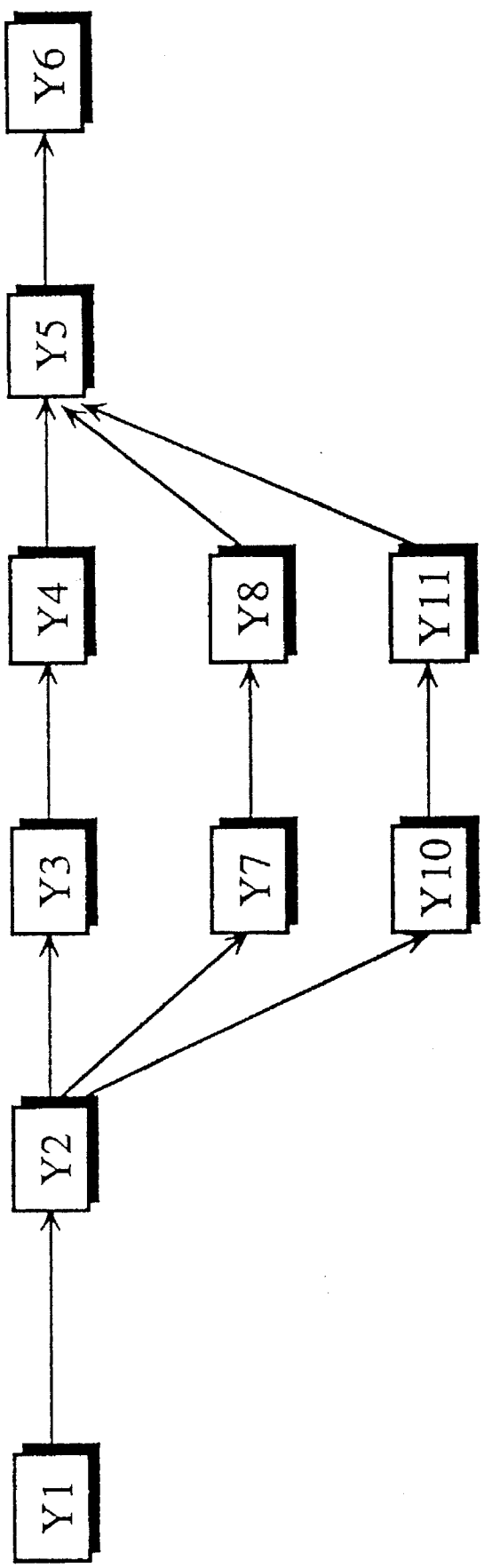
FIG. 1 is a view showing reproduction channels of element data of a conventional data reproduction apparatus.
Figure 2:
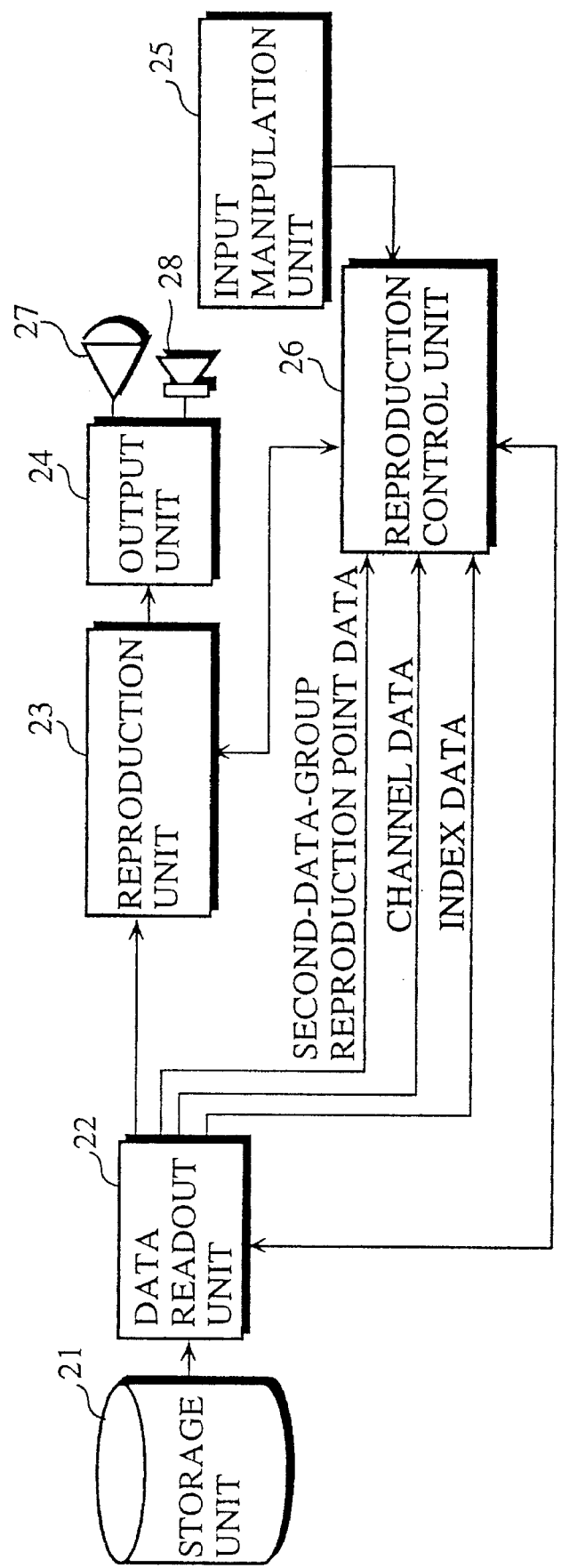
FIG. 2 is a view showing a structure of a data reproduction apparatus in accordance with a first embodiment of the present invention.

FIG. 2 is a view showing a structure of a data reproduction apparatus in accordance with the first embodiment of the present invention. The data reproduction apparatus comprises a storage unit 21 for storing a plurality element data and management data, a data readout unit 22 for reading out the element data and management data stored in the storage unit 21, a reproduction unit 23 for converting the element data read out by the data readout unit 22 into reproduction data, an output unit 24 for outputting the reproduction data from the reproduction unit 23 in the form of a video output and a sound output, an input operation unit 25 for accepting user's instructions, and a reproduction control unit 26 comprising a microprocessor, a ROM, and a RAM storing an operation program; the output unit 24 includes a display screen 27 and a speaker 28.

More precisely, the storage unit 21 includes a data storage medium, or namely a CD-ROM, and a CD-ROM driving system. The CD-ROM stores two kinds of data in the form of digital data: primary data, or a plurality of element data, and management data related to the primary data. One element data are the minimum unit for reproduction, including sound elements, still photograph elements and text elements, and optionally moving-picture elements and animation. The element data are divided into a first data group and a second data group depending on the contents thereof. Whereas the management data consist of index data, channel data, and second-data-group reproduction point data. The index data are used to divide the element data into the first and second data groups. The channel data shows a plurality of reproduction channels of the first data group. The second-data-group reproduction point data shows a set of reproduction points of the second data group within a reproduction channel of the first data group being reproduced.

Figure 3:
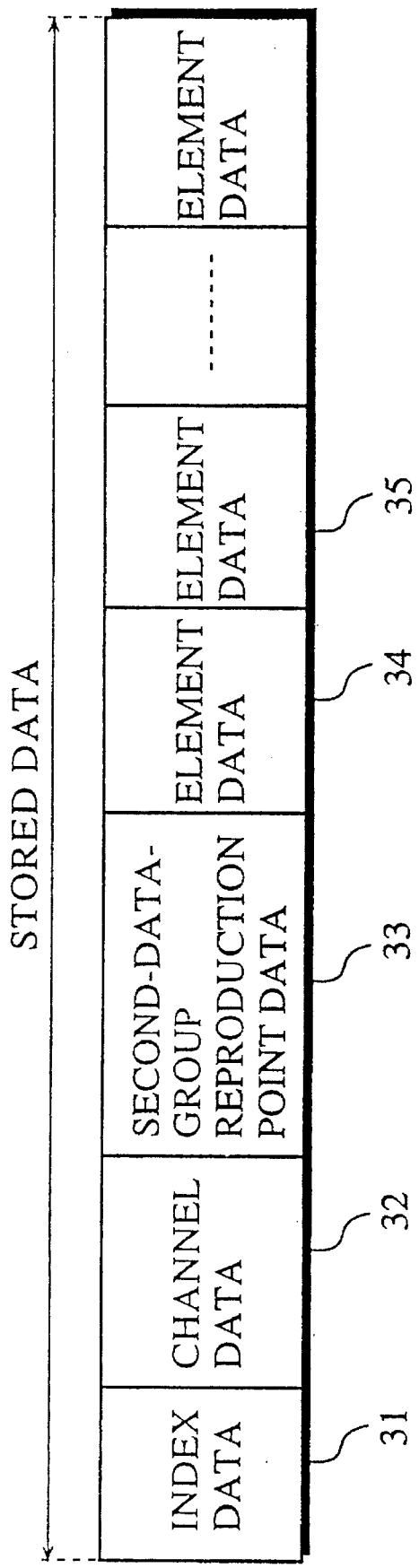
FIG. 3 is a view showing a structure of data stored in a storage unit in the first embodiment.

FIG. 3 is a view showing a structure of data stored in the storage unit 21. The stored data consist of index data 31, channel data 32, second-data-group reproduction point data 33, and element data 34, 35, . . . .

More precisely, the index data 31 consist of a plurality of entries 41, 42, 43, . . . as shown in FIG. 4; the number of the entries matches with the number of the element data. Each entry stores a first data group or second data group code 45 identifying as being either of the first or second data group, an element data identifier 46 identifying individual element data, and an address value 47 indicating the element data's storage location on the CD-ROM.

FIG. 5 shows an example of the index data 31 shown in FIG. 4, although the first or second data group code 45 is not shown.

The CD-ROM in the storage unit 21 stores the element data 34, 35, . . . of either the first or second data group. The element data 34, 35, . . . , are distinguished one from the others by the element data identifiers Y21, Y22, . . . , Y211, and K21, . . . , K25. The index data 51 of the first data group hold the element data identifiers Y21, Y22, . . . , Y211, and their respective address values of the storage location on the CD-ROM. Similarly, the index data 52 of the second data group hold the element data identifiers K21, . . . , K25 and their respective address values of the storage location on the CD-ROM.

Figure 6:
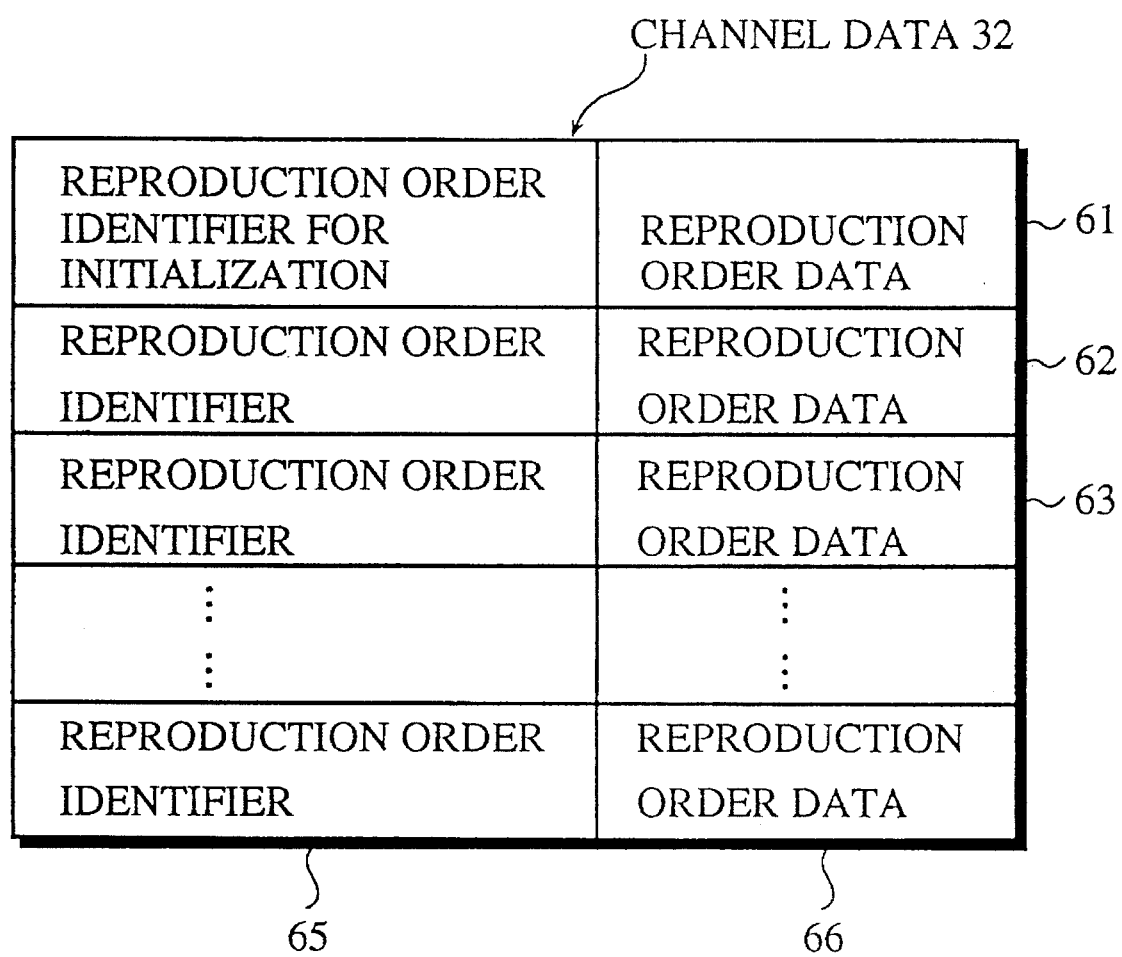
FIG. 6 is a view showing a structure of channel data in the first embodiment.

The channel data 32, as is shown in FIG. 6, consist of a plurality of entries 61, 62, 63, . . . ; the number of the entries matches with the number of the reproduction channels of the first data group. Each entry stores a reproduction order identifier 65 and reproduction order data 66.

The reproduction order data 66 show a reproduction order of the element data within one reproduction channel of the element data of the first data group. The reproduction order identifier 65 is a value representing individual reproduction order data 66.

Note that the first entry 61 of the channel data 32 shows channel data to be selected at the initialization of the data reproduction apparatus.

FIG. 7 is a view showing the structure of the reproduction order data 66, which consist of a plurality of entries 71, 72, . . . ; the number of the entries matches with the number of the element data contained in one reproduction channel. Each entry excluding the last entry stores a reproduction order 75 and the element data identifier 46. A reproduction order 75 is a value representing the reproduction order of the individual element data identified by the element data identifier 46. For example, if five element data identifiers 46 (a1 through a5) are contained in one reproduction channel indicated by the reproduction order data 66 and the reproduction order 75 of the element data identifier a2 shows "4", the element data identified by the element data identifier a2 are the fourth to be reproduced among the five element data.

Also, if the reproduction order data 66 have a branching point at the end, the reproduction order 75 of the last entry include branch judgment data 77, which determine a reproduction channel, besides the element data identifier 46.

FIG. 8 is a view showing a structure of the branch judgment data 77, which consist of a plurality of entries 81, 82, 83 . . . ; the number of the entries matches with the number of reproduction channels. Each entry stores the reproduction order identifier 65 and screen area data 85. The screen area data 85 correspond to an area where a data video is shown on the display screen 27 of the output unit 24; the data video referred herein is a video such that shows the choices to the user, for example, the table of contents.

FIG. 9 shows an example of the channel data 32 in FIG. 6, reproduction order data 66 in FIG. 7, and branch judgment data 77 in FIG. 8.

The channel data 91 divide eleven element data (Y21 through Y211) of the index data 51 in FIG. 5 into four reproduction channels. Each reproduction channel stores the reproduction order identifiers P21 through P24 and the reproduction order data S21 through S24, respectively.

The reproduction order data S21 hold the element data identified by the element data identifier Y21 placed first in the reproduction order, and the element data identified by the element data identifier Y22 second. The reproduction order data S21 store the branch judgment data B21 besides the element data identifier placed last (herein the element data identifier Y22 placed second). This is because there exists a branching point at the end of the reproduction channel for the reproduction order data S21.

The reproduction order data S22 hold the element data specified by the element data identifiers Y23 through Y26 placed first through fourth respectively. Likewise, the reproduction order data S23 hold the element data specified by the element data identifiers Y27, Y28, Y25, and Y26 placed first through fourth respectively, and the reproduction order data S24 hold the element data specified by the element data identifiers Y210, Y211, Y25, and Y26 placed first through fourth respectively.

The branch judgment data B21 determine to which of the reproduction order data S22, S23, and S24 the user should branch subsequent to the reproduction of the reproduction order data S21. The branch judgment data B21 hold the screen area data G21, G22, and G23 corresponding to the reproduction order data S22, S23, and S24 respectively. The screen area data G21, G22, and G23 are, for example, composed of the location coordinates of two vertices of one diagonal line if the area is displayed as a rectangle.

FIG. 10 is a view showing a structure of the second-data-group reproduction point data 33, which consist of a plurality of entries 101, 102, 103, . . . ; the number of the entries matches with the number of the element data of the second data group to be reproduced after the reproduction of those of the first data group. Each entry stores a reproduction point identifier 104, the reproduction order identifier 65, and location data 105.

The location data 105 show the point where the element data of the second data group are reproduced within the reproduction channel of the element data of the first data group being reproduced. For example, if one entry holds the reproduction order identifier o1 and "5" as the location data 105 (not shown), then there exists the reproduction point of the element data of the second data group between the element data of the first group to be reproduced in the fifth and sixth of the reproduction order data 66 specified by the reproduction order identifier o1.

FIG. 11 shows an example of the second-data-group reproduction point data 33 in FIG. 10; the reproduction point identifier 104 is omitted.

The second-data-group reproduction point data 110 show the reproduction points where the element data 34, 35 . . . of the second data group identified by the element data identifiers K21 through K25 (FIG. 5) are reproduced respectively. Here, the second-data-group reproduction point data 110 hold location data "2" for both the reproduction order identifiers P23 and P24. Thus, one of the element data of the second data group indicated by the element data identifiers K21 through K25 are reproduced after the element data identified by the element data identifier Y28 placed second of the reproduction order data identified by the reproduction order identifier P23. In the same manner, one element data of the second data group are reproduced after the element data identified by the element data identifier Y211 are reproduced.

Figure 12:
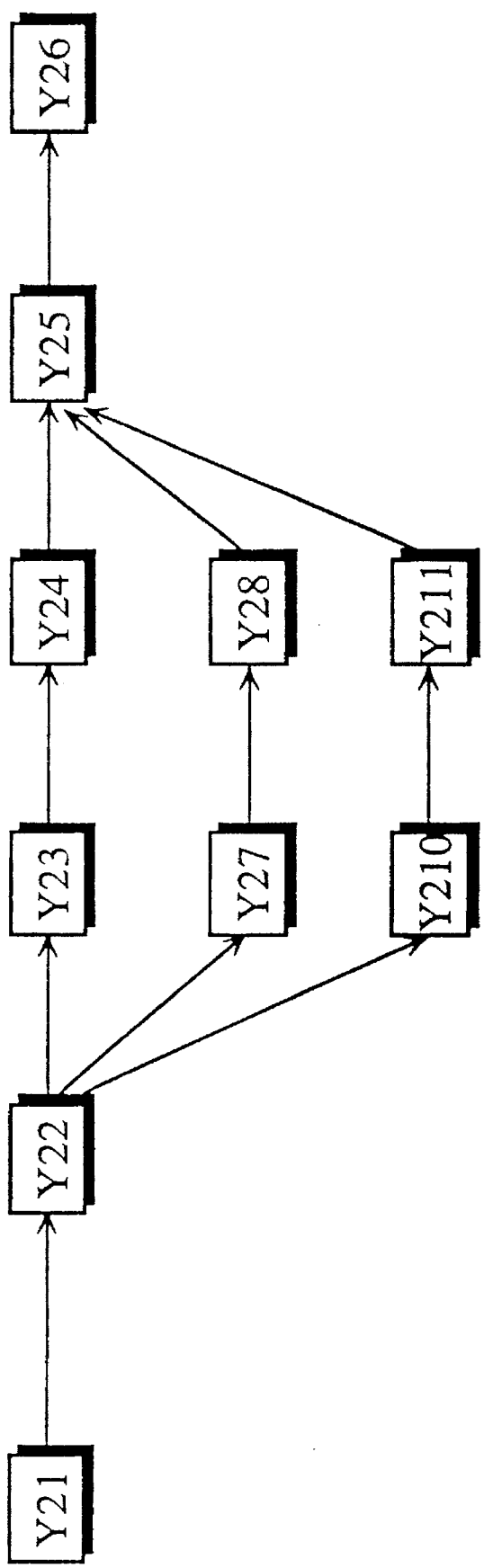
FIG. 12 is a view showing reproduction of element data in the first embodiment.

FIG. 12 schematically shows how the reproduction proceeds using the data shown in FIG. 9 through the reproduction channels.

Upon input of control data to read out the management data from the reproduction control unit 26, the data readout unit 22 reads out the digital data stored in the storage unit 21, or namely, the index data 31, channel data 32, and second data-group reproduction point data 33. Subsequently, the data readout unit 22 inputs the channel data 32 and second-data-group reproduction point data 33 into the reproduction control unit 26, while having the index data 31 be stored in the reproduction control unit 26.

Upon input of the address value from the reproduction control unit 26, the data readout unit 22 reads out the element data stored at the corresponding address on the CD-ROM of the storage unit 21 to output the same to the reproduction unit 23.

Upon input of the digital data of the element data from the data readout unit 22, the reproduction unit 23 separates the sound data, still photograph data, and text data in the element data to output the same to the output unit 24 after predetermined processing through buffering. To be more specific, the text data are developed into a specified font, rendered together with the still photograph data, and converted into video digital data. Whereas the sound data are linear quantalized, and converted into sound digital data.

The output unit 24 converts the video digital data into an video output signal (video analog signal), while converting the sound digital data into the sound output signal (sound analog signal); the former is outputted from the display screen 27 and the latter from the speaker 28.

Figure 13:
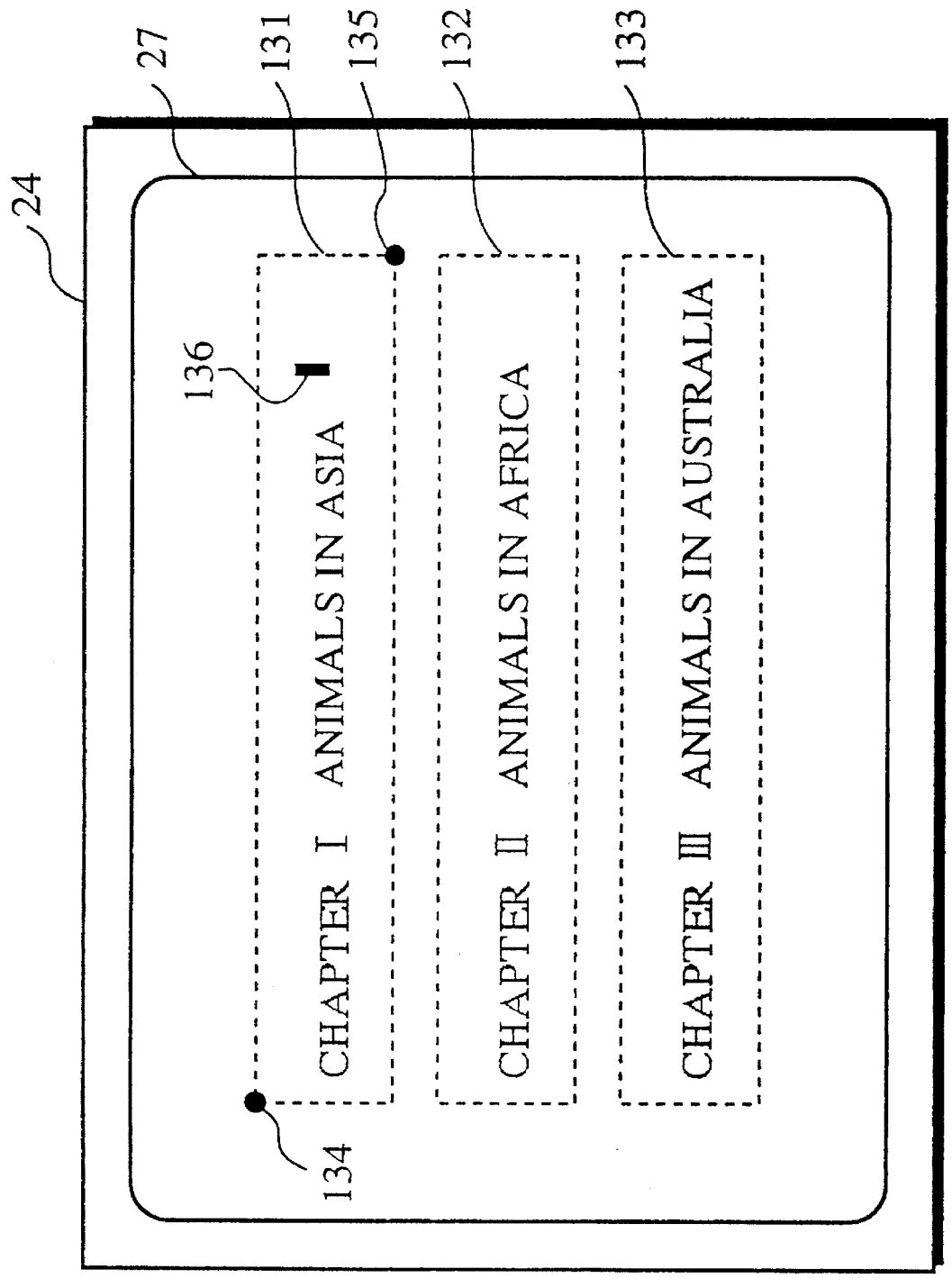
FIG. 13 is a view showing an example of a video on display in the first embodiment.

FIG. 13 shows a video display of the element data when the last reproduction order data 66 have a branching point. The video display areas 131, 132, 133, which are the table of contents showing the choices of branching, are shown on the display screen 27 of the output unit 24. For example, the location coordinates of two vertices 134, 135 of the video display area 131, (x1, y1) and (x2, y2), are stored in the form of the screen area data G21 of the branch judgment data B21 shown in FIG. 9.

The input manipulation unit 25 (herein a mouse) is used to receive the user's instruction to specify the video display area of the data such as the table of contents to be shown on the display screen 27 to output the location coordinate of the input data to the reproduction control unit 26.

When the reproduction has reached at the last entry of the reproduction order data 66 that have the branching point, the video display shown in FIG. 13 appears. Thus, the user can confirm he has reached the branching point, and accordingly moves a mouse cursor 136 to "Chapter I, Animals in Asia" shown within the video display area 131 to select the reproduction channel. By so doing, the location coordinate (x, y) of the mouse cursor 136 is inputted into the reproduction control unit 26 by means of the input manipulation unit 25.

The reproduction control unit 26 consists of the microprocessor, ROM, and RAM storing the operation program as previously mentioned. The ROM stores a boot program, which is automatically activated when the data reproduction apparatus is turned on to load the operation program, or application program stored in a predetermined location on the CD-ROM of the storage unit 21, to the RAM, realizing the structure shown in FIG. 14.

Figure 14:
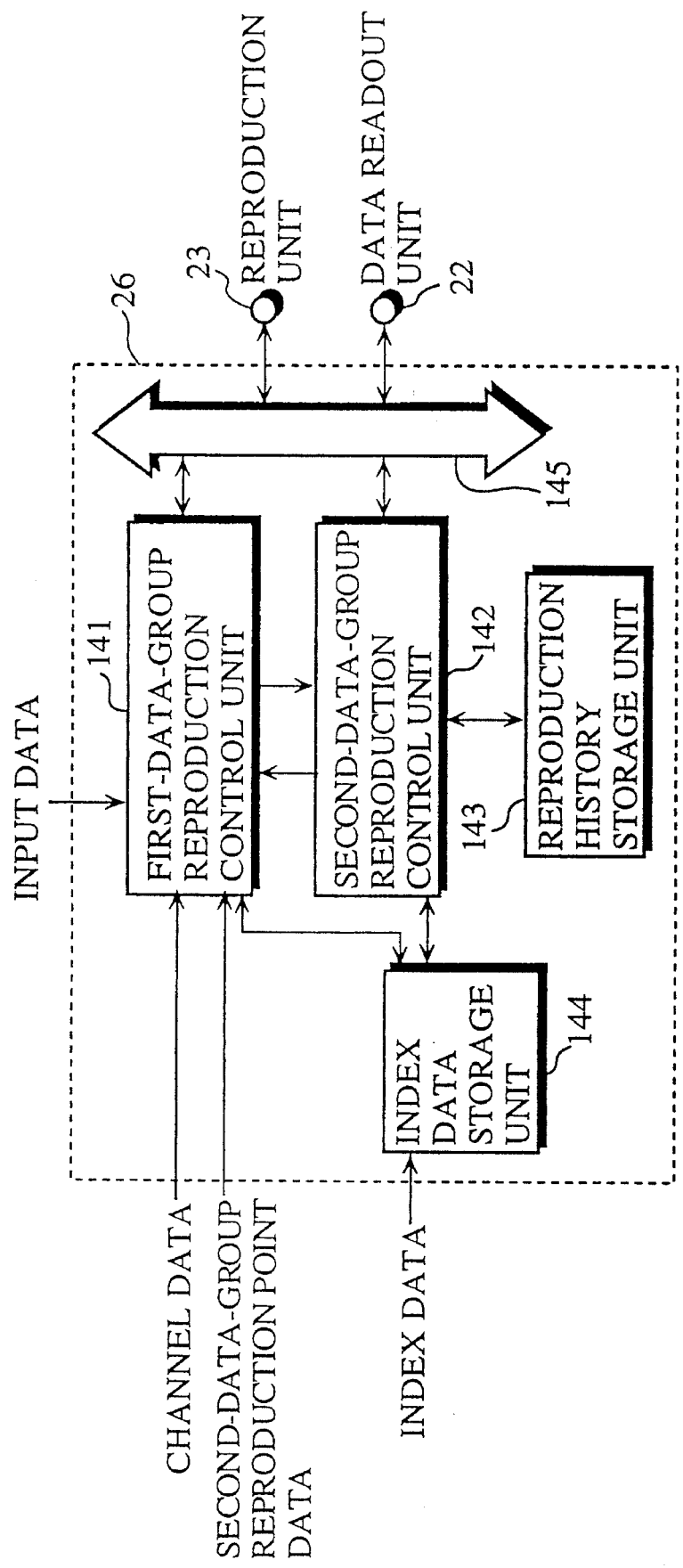
FIG. 14 is a view showing a detailed structure a reproduction control unit in the first embodiment.

FIG. 14 is a view showing the structure of the reproduction control unit 26 in detail. The reproduction control unit 26 includes a first-data-group reproduction control unit 141, a second-data-group reproduction control unit 142, a reproduction history storage unit 143, and an index data storage unit 144; the first two components are connected to the reproduction unit 23 and data readout unit 22 by means of a data bus 145.

The first-data-group reproduction control unit 141 initializes the reproduction history storage unit 143 and index data storage unit 144 when the data reproduction apparatus is turned on, while outputting control data to the data read out unit 22 to read out the management data. Accordingly, the first-data-group reproduction control unit 141 stores the channel data 32 and second-data-group reproduction point data 33 into a buffer installed therein upon receipt of the same from the data readout unit 22. Further, the first-data-group reproduction control unit 141 extracts the entry 61 (FIG. 6) of the reproduction order data 66 identified by the reproduction order identifier for initialization to determine the element data to be reproduced as per the reproduction order 75 (FIG. 7) in the reproduction order data 66 identified by the reproduction order identifier 65.

The first-data-group reproduction control unit 141 reads out the index data 31 stored in the index data storage unit 144 to extract the address value 47, which corresponds to the element data identifier 46 placed first in the determined reproduction order 75.

The first-data-group reproduction control unit 141 outputs the extracted address value 47 to the data readout unit 22, and judges whether or not the data in the reproduction order identifier 65 (FIG. 6) and reproduction order 75 (FIG. 7) coincide respectively with the reproduction order identifier 65 and location data 105 in the entries 101, 102, 103, . . . of the second-data-group reproduction point data 33 stored in the self-installed buffer.

When the data do not coincide, the first-data-group reproduction control unit 141 extracts the address value 47, which corresponds to the element data identifier 46 of the following reproduction order 75 from the index data 31, to output the same to the data readout unit 22.

When the data coincide, the first-data-group reproduction control unit 141 activates the second-data-group reproduction control unit 142, because such data coincidence means that the current reproduction order is the reproduction point of the element data of the second data group.

Assume that the first-data-group reproduction control unit 141 determines the reproduction of the element data identified by the element data identifier Y28 shown in FIG. 12, then the first-data-group reproduction control unit 141 outputs the address value 47 corresponding to the element data identifier Y28 to the data readout unit 22.

The element data identified by the element data identifier Y28 are specified by the reproduction order identifier P23 and placed second in the reproduction order (FIG. 9). Thus, the first-data-group reproduction control unit 141 judges whether or not the element data identified by the element data identifier Y28 coincide with the entries 111 and 112 of the second-data-group reproduction point data (FIG. 11).

In this case, the element data identified by the element data identifier Y28 coincide with the entry 111, and the first-data-group reproduction control unit 141 suspends the reproduction of the element data identified by the element data identifier Y25 to activate the second-data-group reproduction control unit 142. The first-data-group reproduction control unit 141 resumes the reproduction control of the element data identified by the element data identifier Y25 upon receipt of the control data to terminate the reproduction of the element data of the second data group from the second-data-group reproduction control unit 142.

When the element data identified by the last entry of the reproduction order data 66 has been thoroughly reproduced by means of the output unit 24 and the last entry has a branching point (having a plurality of reproduction channels), the first-data-group reproduction control unit 141 determines the reproduction channel to the branched element data. Upon receipt of the input data, or the cursor's location coordinate (x, y), from the input manipulation unit 25, the first-data-group reproduction control unit 141 reads out the branch judgment data 77 stored in the self-installed buffer to judge in which screen area data 85 the location coordinate exists. When the location coordinate exists in a particular screen area data 85, the first-data-group reproduction control unit 141 controls the reproduction of the element data of the first data group by the reproduction channel as per the reproduction order data 66 identified by the corresponding reproduction order identifier 65.

Assume that the first-data-group reproduction control unit 141 is reproducing the element data identified by the element data identifier Y22 shown in FIG. 12, then the first-data-group reproduction control unit 141 reads out the screen area data G21, G22, and G23 of the branch judgment data B21 (FIG. 9) stored in the self-installed buffer when the location coordinate (x, y) is inputted from the input manipulation unit 25. Accordingly, the first-data-group reproduction control unit 141 judges whether or not the location coordinate (x, y) exists within the area of the screen area data G21 specified by the location coordinates (x1, y1) and (x2, y2).

When the location coordinate (x, y) is judged to exist within the screen area data G21, the first-data-group reproduction control unit 141 controls the reproduction of the element data identified by the element data identifiers Y23-Y24-Y25-Y26 as per the corresponding reproduction order data S22. Likewise, when the location coordinate (x, y) is judged to exist within the screen area data G22, the first-data-group reproduction control unit 141 controls the reproduction of the element data identified by the element data identifiers Y27-28-Y25-Y26 as per the corresponding reproduction order data S23.

The second-data-group reproduction control unit 142, when activated by the first-data-group reproduction control unit 141, reads out the reproduction history data stored in the reproduction history storage unit 143 and the index data 31 stored in the index data storage unit 144. In so doing, the second-data-group reproduction control unit 142 selects one element data identifier 46 at random, excluding the ones that coincide with those stored in the reproduction history data. In other words, when five element data identifiers 46 are stored in the index data 52 in FIG. 5, and the element data identifier K22 is stored in the reproduction history data, then the number of the element data stored in the reproduction history data is subtracted from the total number of the element data; five minus one herein. The second-data-group reproduction control unit 142 generates a random number by combining a natural number equal to or less than the result of the subtraction (four herein). If the top of the random numbers thus generated exhibits three, the second-data-group reproduction control unit 142 deletes the element data identifier K22, and selects the element data identified by the element data identifier K24, the entry placed third from the top of the index data 52. Then, the second-data-group reproduction control unit 142 extracts the address value 47, which corresponds to the element data identifier K24, to output the same to the data readout unit 22, while writing the selected element data identifier K24 into the reproduction history storage unit 143 to update the reproduction history data. Upon completion of the reproduction of the element data of the second data group, the second-data-group reproduction control unit 142 outputs the control data to terminate the reproduction of the element data of second data group to the first-data-group reproduction control unit 141.

The reproduction history storage unit 143 stores the reproduction history data, which consist of the identifiers of the element data which have been outputted from the output unit 24 among the element data of the second data group. The reproduction history data are written by the second-data-group reproduction control unit 142 as previously mention.

The index data storage unit 144 stores the index data 31, 51, 52, which are read out from the storage unit 21 by the data readout unit 22.

Figure 15:
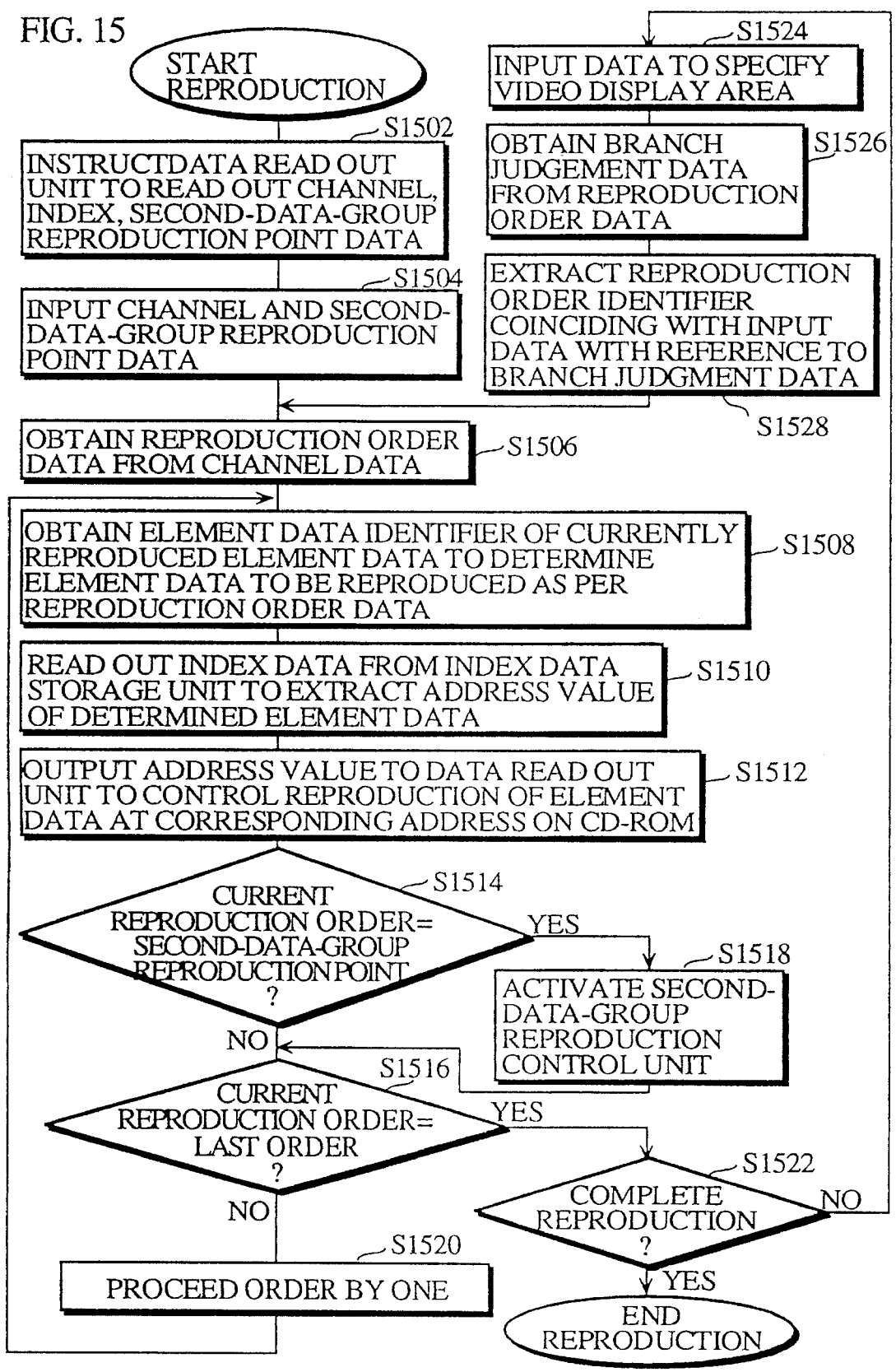
FIG. 15 is a flowchart detailing an operation of the reproduction control unit in the first embodiment.
Figure 16:
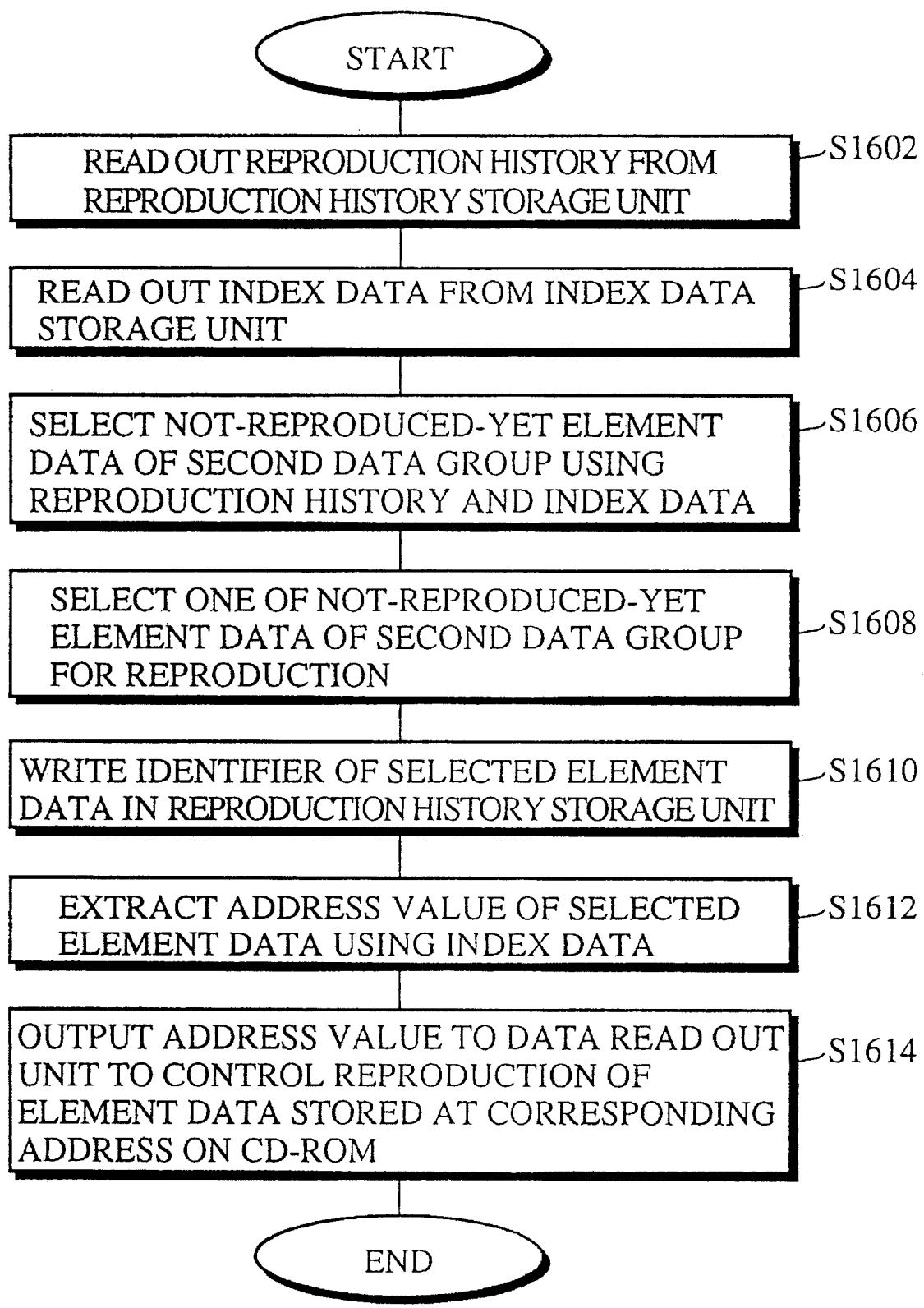
FIG. 16 is another flowchart detailing an operation of the reproduction control unit in the first embodiment.

Next, the operation of the above structured data reproduction apparatus will be explained while referring to the flowcharts in FIGS. 15 and 16.

When the data reproduction apparatus is turned on, the data reproduction starts. More precisely, the first-data-group reproduction control unit 141 initializes the index data storage unit 144 and reproduction history storage unit 143, while outputting the control data to the data readout unit 22 to read out the channel data 32, index data 31, and second-data-group reproduction point data 33 (S1502).

Accordingly, the first-data-control reproduction control unit 141 receives the input of the channel data 32 and second-data-group reproduction data 33 from the data readout unit 22, while storing the index data 31 read out by the data readout unit 22 in the index data storage unit 144 (S1504).

Then, the first-data-group reproduction control unit 141 obtains the reproduction order data 66 from the channel data 32 (S1506), and the element data identifier 46 of the element data currently being reproduced as per the reproduction order data 66 as well to determine the element data to be reproduced (S1508). Further, the first-data-group reproduction control unit 141 reads out the index data 31 from the index data storage unit 144 to extract the address value 47 of the determined element data (S1510), and outputs the same to the data readout unit 22 to control the reproduction of the element data stored at the specified address on the CD-ROM (S1512). The first-data-group reproduction control unit 141 subsequently judges whether or not the reproduction order coincides with the reproduction point of the second data group stored in the second-data-group reproduction point data 33 (S1514). When the reproduction order does not coincide with the reproduction point, then the first-data-group reproduction control unit 141 judges whether or not the current order is placed last in the order (S1516).

Otherwise, the first-data-group reproduction control unit 141 activates the second-data-group reproduction control unit 142 to proceed to S1602 of the sub-routine (S1518).

By so doing, the reproduction point of the second data group can be set arbitrarily at any point within the reproduction channel of the data element of the first data group. For this reason, the electronic book editor can fix the point where the advertisement data are displayed in such a way that the element data of the first and second data group can be reproduced continuously.

When the current order is not placed last in the order, the first-data-group reproduction control unit 141 proceeds to the following reproduction order (S1520) to return to S1508. Otherwise, the first-data-group reproduction control unit 141 judges whether or not the reproduction has been completed (S1522). When the reproduction has been completed, the entire processing is terminated; otherwise, the first-data-group reproduction control unit 141 proceeds to S1524 to determine the reproduction channel (S1522).

The first-data-group reproduction control unit 141 receives the input data indicating the video display area from the input manipulation unit 25 (S1524). Then, the first-data-group reproduction control unit 141 obtains the branch judgment data 77 from the reproduction order data 66 (1526) to extract the reproduction order identifier 65 determined by the display area data 85 of the branch judgment data 77 and the input data (S1528), and thus proceeding to S1506.

Next, the sub-routine of S1518 will be explained. The second-data-group reproduction control unit 142 reads out the reproduction history data from the reproduction history storage unit 143 (S1602), and the index data 31 of the second data group from the index data storage unit 144 (S1604) to select the identifiers of the element data of the second group which are not reproduced yet (not-reproduced-yet element data) by deleting the element data whose identifiers coincide with those in the reproduction history data (S1606). Accordingly, the second-data-group reproduction control unit 142 selects one element data from the not-reproduced-yet element data of the second data group at random as per certain procedure (S1608).

By so doing, the electronic book editor can distinguish the electronic book data of the first data group from the advertisement data of the second data group. Accordingly, the editor can have individual advertisement data appear at an equal chance independently of the reproduction channel or branched element data of the first data group.

The second-data-group reproduction control unit 142 writes the identifier of the selected element data into the reproduction history storage unit 143 (S1610) to extract the address value 47 of the element data determined to be reproduced by the index data 31 (S1612). Subsequently, the second-data-group reproduction control unit 142 outputs the address value 47 to the data readout unit 22 to control the reproduction of the element data stored at the corresponding address on the CD-ROM (S1614), and proceeds to S1516.

Next, to visualize the effect of the present invention, that is to say, having individual element data of the second data group (advertisement data) appear at an equal frequency, the chances to be reproduced will be computed with reference to FIG. 12. Assume that the chances of the element data identified by the element data identifier Y22 to branch to the element data identified by the element data identifier Y23 is 1/7, to the element data identified by the element data identifier Y27 is 2/7, to the element data identified by the element data identifier Y210 is 4/7. Note that since the element data of the second data group are randomly selected for reproduction at the reproduction point (FIGS. 9 and 11), no specific advertisement data will be reproduced fixedly at a specific point in the reproduction channel.

For this reason, the chances do not depend on the chances for the individual reproduction points to appear, but the total of the chances for the reproduction points to appear. More precisely, the chances for the reproduction point of the second data group to appear are 2/7+4/7=6/7. The chances for each element data to be selected subsequent to the element data of the second data group are 1/5 when there are five element data, thus the chances for each element data of the second data group are 6/7×1/5=6/35, providing chances of appearance equally for each individual element data of the second group.

SECOND EMBODIMENT

Figure 17:
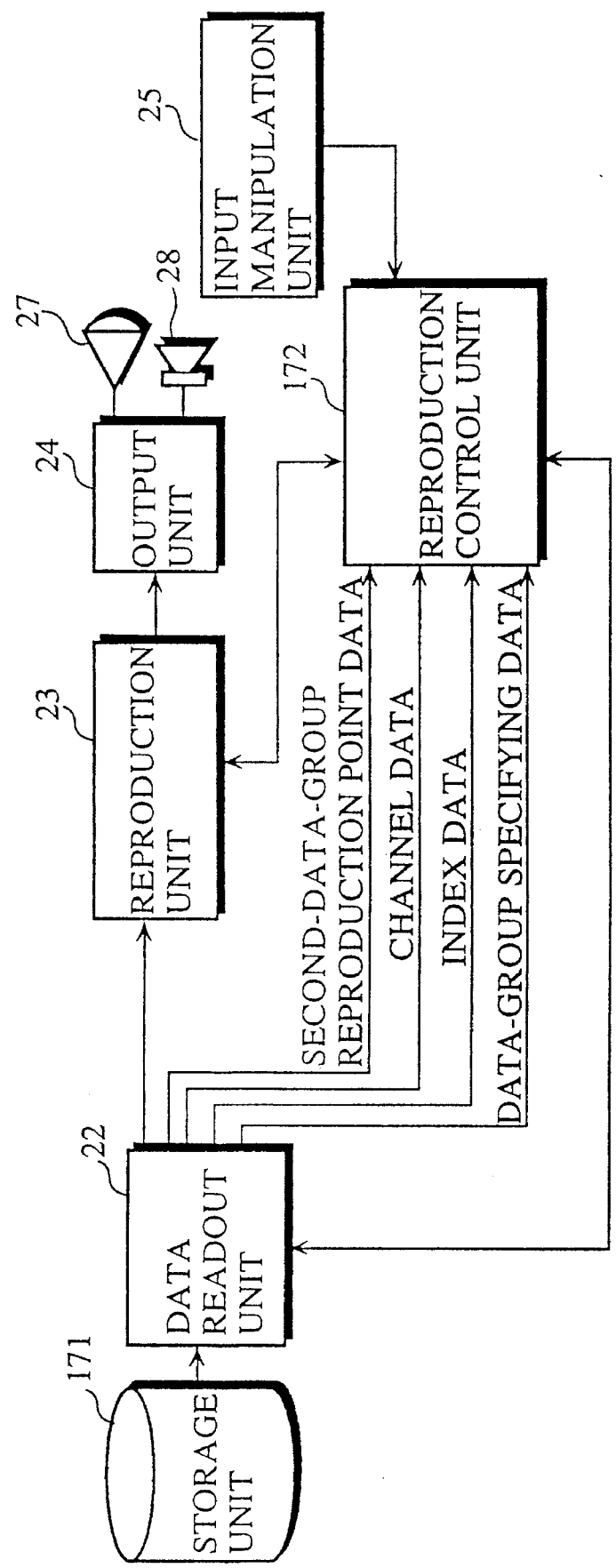
FIG. 17 is a view showing a structure of a data reproduction apparatus in accordance with a second embodiment of the present invention.

FIG. 17 is a view showing the structure of a data reproduction apparatus in accordance with the second embodiment. The data reproduction apparatus is of the same structure as the first embodiment except that the storage unit 21 is replaced with a storage unit 171 and the reproduction control unit 26 is replaced with a reproduction control unit 172. Hereinafter, like components are labeled with like reference numerals with respect to the first embodiment, and the description of these components is not repeated.

The storage unit 171 comprises a data storage medium, or namely a CD-ROM, and a CD-ROM driving system. The CD-ROM of the storage unit 171 stores two kinds of data in the form of digital data: primary data, or a plurality of element data and management data related to the primary data. One element data are the minimum unit for the reproduction, consisting of sound elements, a still photograph elements, and text elements, and optionally moving picture elements. The element data are divided into a first data group and a second data group depending on the content thereof.

The management data consist of the index data, channel data, second-data-group reproduction point data, and data-group specifying data. The index data are used to divide the element data into the first and second data group. The channel data and second-data-group reproduction point data are of the same structure as those in the first embodiment and the explanation thereof is omitted. The data-group specifying data specifies the element data of the second data group to be reproduced at the reproduction point.

Figure 18:
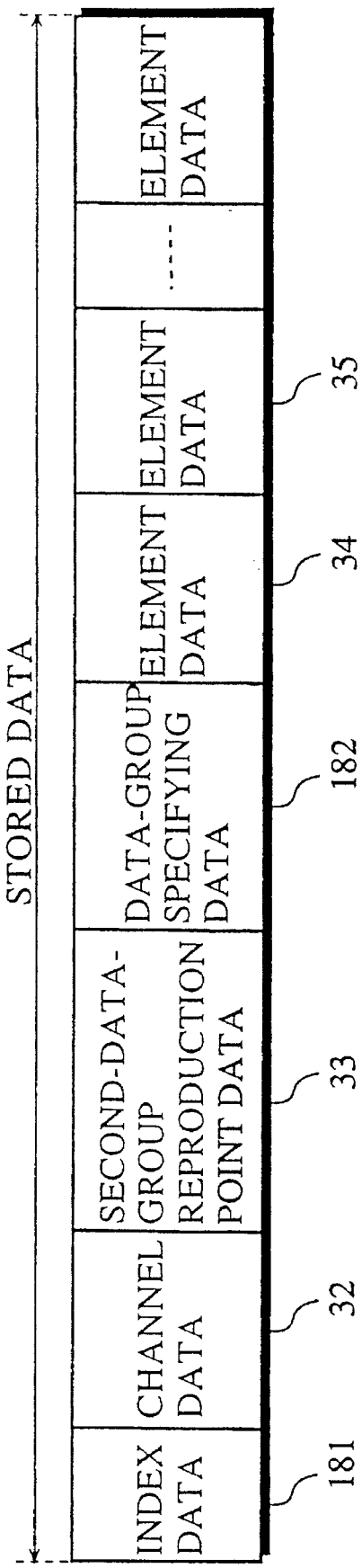
FIG. 18 is a view showing a structure of stored data in a storage unit in the second embodiment.

FIG. 18 is a view showing the structure of the data stored in the storage unit 171, which consist of index data 181, channel data 32, second-data-group reproduction point data 33, data-group specifying data 182, and the element data 34, 35, . . . .

The index data 181, as shown in FIG. 19, consist of a plurality of entries 191, . . . , 192, 193, 194, 195, . . . ; the number of the entries matches with the number of the element data. Each entry consists of either a first data group code 197 or second data group identifier 197 indicating the first and second data group respectively, element data identifier 46 indicating individual element data, and address value 47 indicating where the element data are stored on the CD-ROM. Note that the all first data group codes 197 for the entries 191, . . . , and 192 exhibit a single value, for example "1b" (not shown). However, the second data group identifiers 197 for the entries 193, . . . exhibit different values; for example "2b" is given to those of the entries 193, 194, 195, and "3b" is given to those of the entries 196, . . . .

Figure 20:
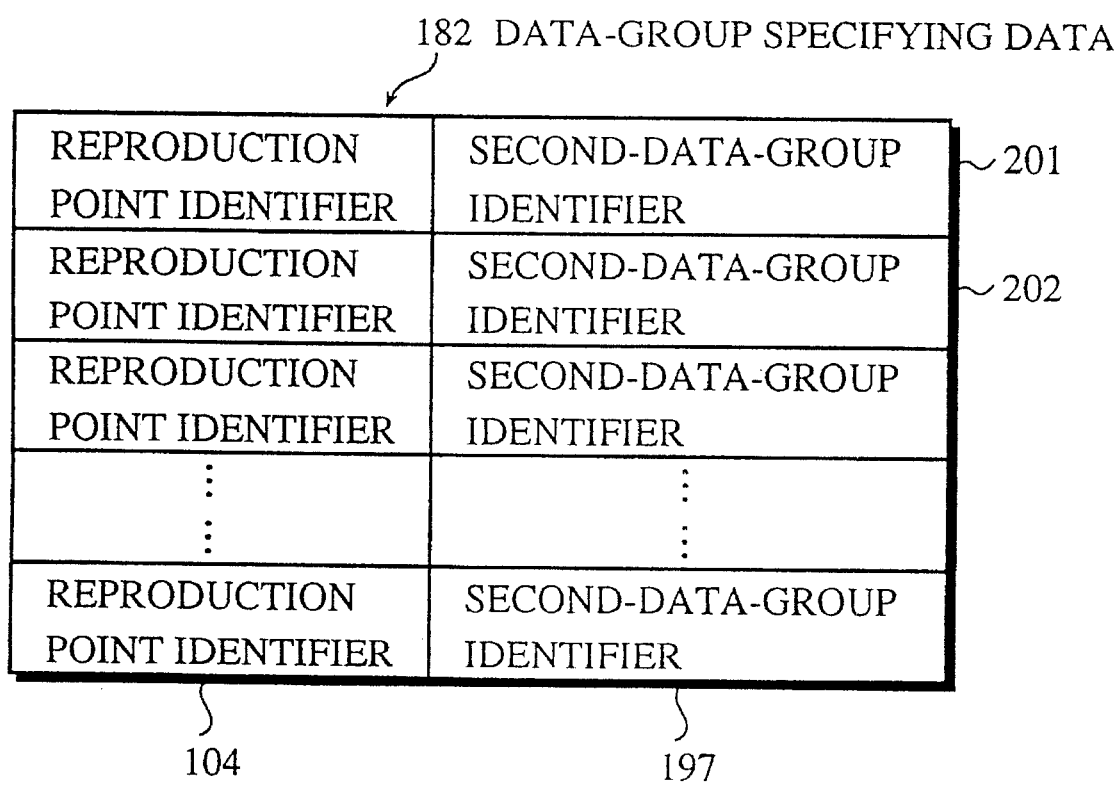
FIG. 20 is a view showing a structure of data-group specifying data in the second embodiment.

FIG. 20 is a view showing the structure of the data-group specifying data 182. The data-group specifying data 182 consist of a plurality of entries 201, 202, . . . . Each entry stores a reproduction point identifier 104 and a second data group identifier 197. Like the second-data-group reproduction point data 33 (FIG. 10), the reproduction point identifier 104 is used to indicate the reproduction point of the element data of the second data group.

The reproduction control unit 172 comprises a microprocessor, a ROM, and a RAM storing an operation program.

Figure 21:
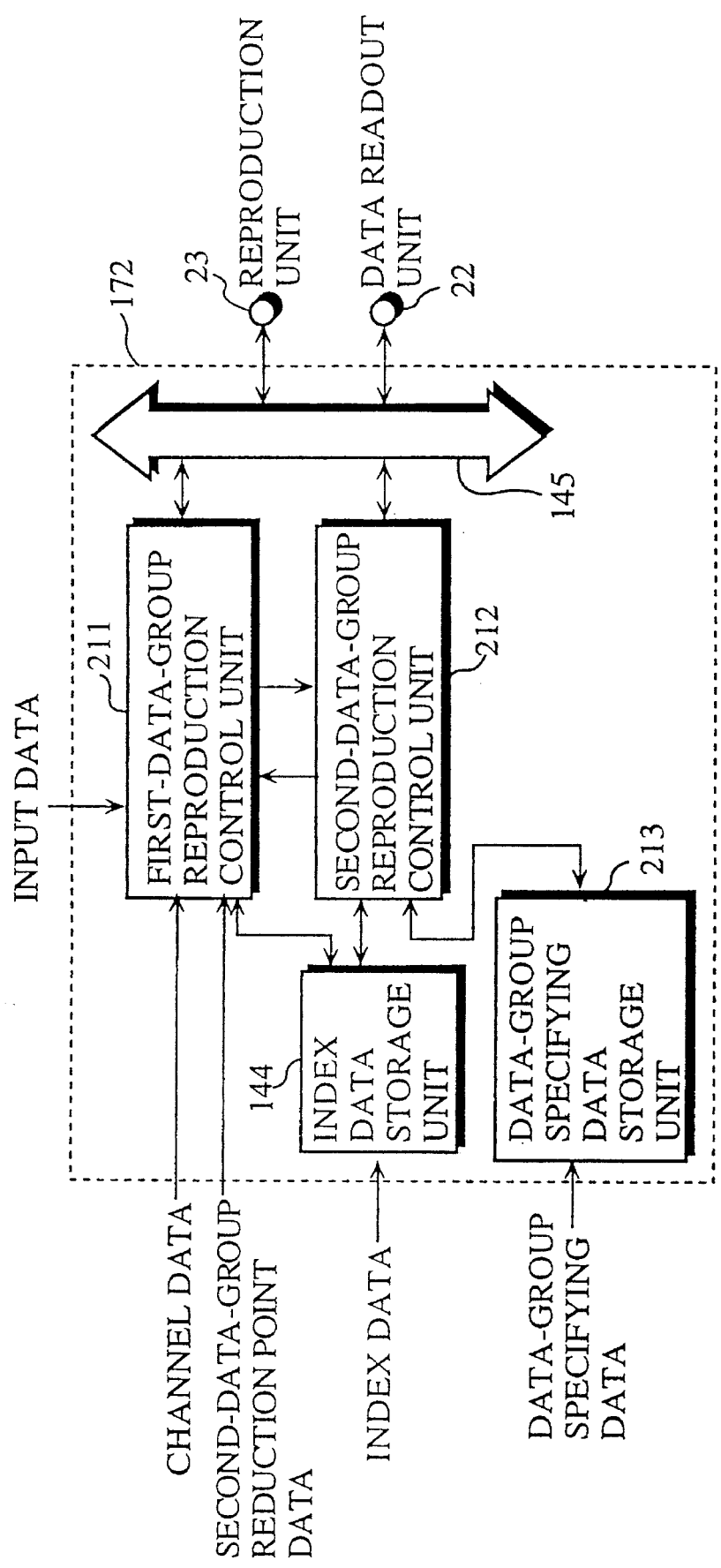
FIG. 21 is a detailed view showing a reproduction control unit in the second embodiment.

FIG. 21 is a view showing the detailed structure of the reproduction control unit 172. The reproduction control unit 172 includes a first-data-group reproduction control unit 211, a second-data-group reproduction control unit 212, a data-group specifying data storage unit 213, and the index data storage unit 144; the first two components are connected to the reproduction unit 23 and data readout unit 22 by means of the data bus 145.

The first-data-group reproduction control unit 211, compared with the first-data-group reproduction control unit 141 in the first embodiment, additionally outputs the control data to the data readout unit 22 to read out the data-group specifying data (management data) at the initialization, and outputs an identifier that identifies the reproduction point to the second-data-group reproduction control unit 212 upon judging the reproduction point of the element data of the second data group.

The second-data-group reproduction control unit 212 is activated by the first-data-group reproduction control unit 211, and receives the reproduction point identifier. The second-data-group reproduction control unit 212 reads out the entries 201, 202, . . . of the data-group specifying data 182 stored in the data-group specifying data storage unit 213 to extract the second data group identifier 197 which corresponds to the reproduction point identifier 104. Then, the second-data-group reproduction control unit 212 selects a plurality of element data identifiers 46 from the index data 181 stored in the index data storage unit 144 that coincide with the extracted second data group identifiers 197. Further, the second-data-group reproduction control unit 212 determines one element data identifier 46 among the plurality of selected element data identifiers 46, and extracts the address value 47 corresponding to the index data 181 to send the same to the data readout unit 22.

The data-group specifying data storage unit 213 stores the data-group specifying data 183. The data-group specifying data 182 are read out to be stored in the storage unit 171 by means of the data readout unit 22.

Figure 22:
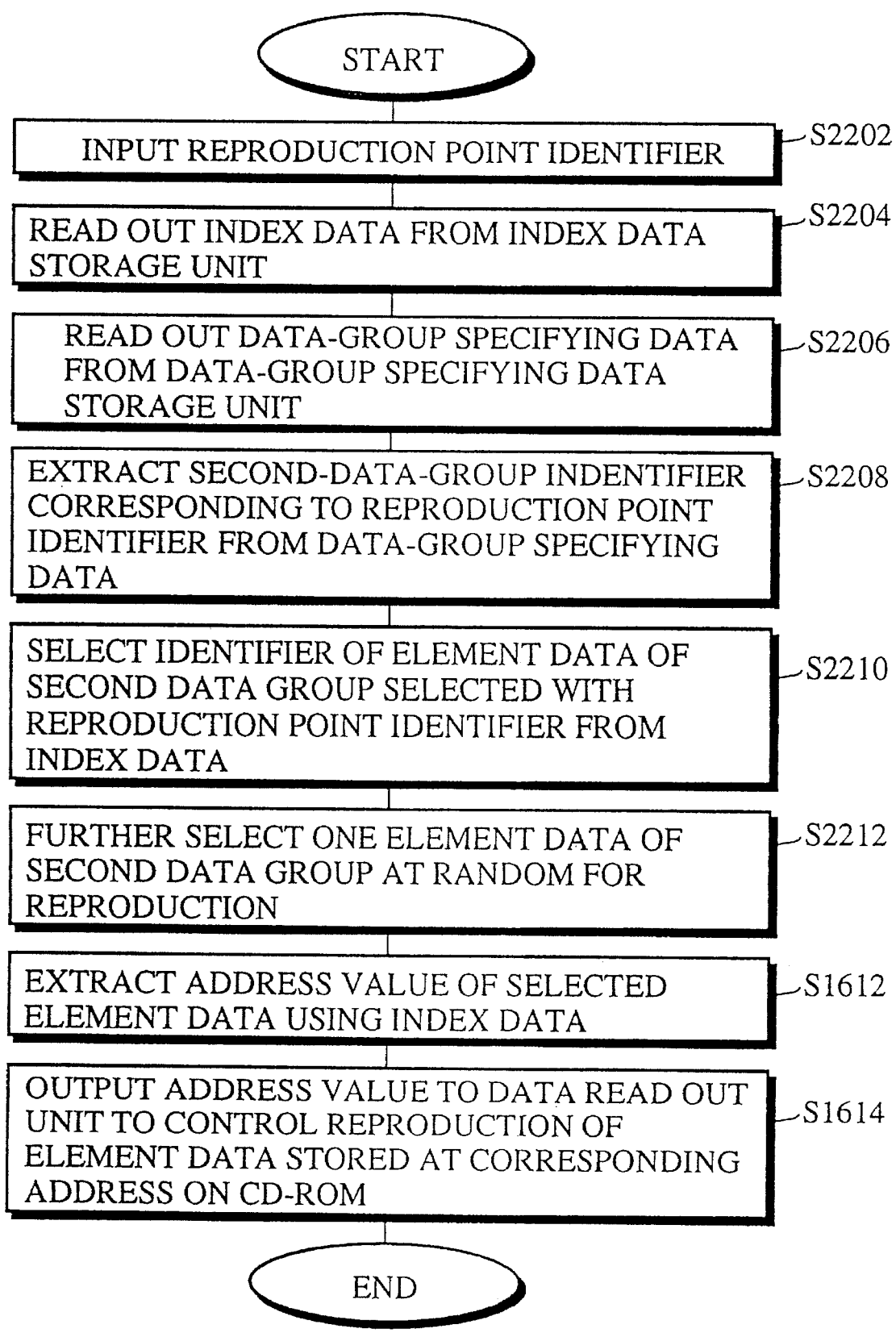
FIG. 22 is a flowchart detailing an operation of the reproduction control unit of the second embodiment.

Next, the operation of the data reproduction apparatus of the second embodiment will be explained. The operation of the data reproduction apparatus of the second embodiment is also detailed by the flowchart in FIG. 15 except for a part of the sub-routine of S1518 (S1602 through 1610). Thus, only the different steps will be explained with reference to the flowchart in FIG. 22.

The second-data-group reproduction control unit 212 is activated by the input of the reproduction point identifier 104 from the first-data-group reproduction control unit 211 (S2202). The second-data-group reproduction control unit 212 reads out the index data 181 from the data storage unit 144 and the data-group specifying data 182 from the data-group-specifying data storage unit 213 (S2204, S2206). The second-data-group reproduction control unit 212 extracts the second-data group identifier 197 corresponding to the reproduction point identifier 104 from the data-group specifying data 182 (S2208).

Then, the second-data-group reproduction control unit 212 selects a plurality of element data identifiers 46 from the index data 1811, whose corresponding second-data-group identifiers 197 matches with the second-data-group identifier 197 extracted from the data-specifying data 182 (S2210). The second-data-group reproduction control unit 212 determines one element data identifier 46 among the selected plurality of element data identifiers 46 at random (S2212). The rest is carried out in the same manner as S1612 and onwards in the first embodiment.

Assume that the element data of the first data group are various article data (scene files), and the element data of the second data group include the advertisements related to automobiles and toys, and the former are placed in the reproduction channel of the scene files intended for grown-ups, and the latter in the reproduction channel of the scene files intended for children. Given these circumstances, only the automobile advertisement data are reproduced in the reproduction channel for the scene files for grown-ups, and only the toy advertisement data are reproduced in the reproduction channel for the scene files for children, making it possible to reproduce the advertisement data at appropriate places.

THIRD EMBODIMENT

Figure 23:
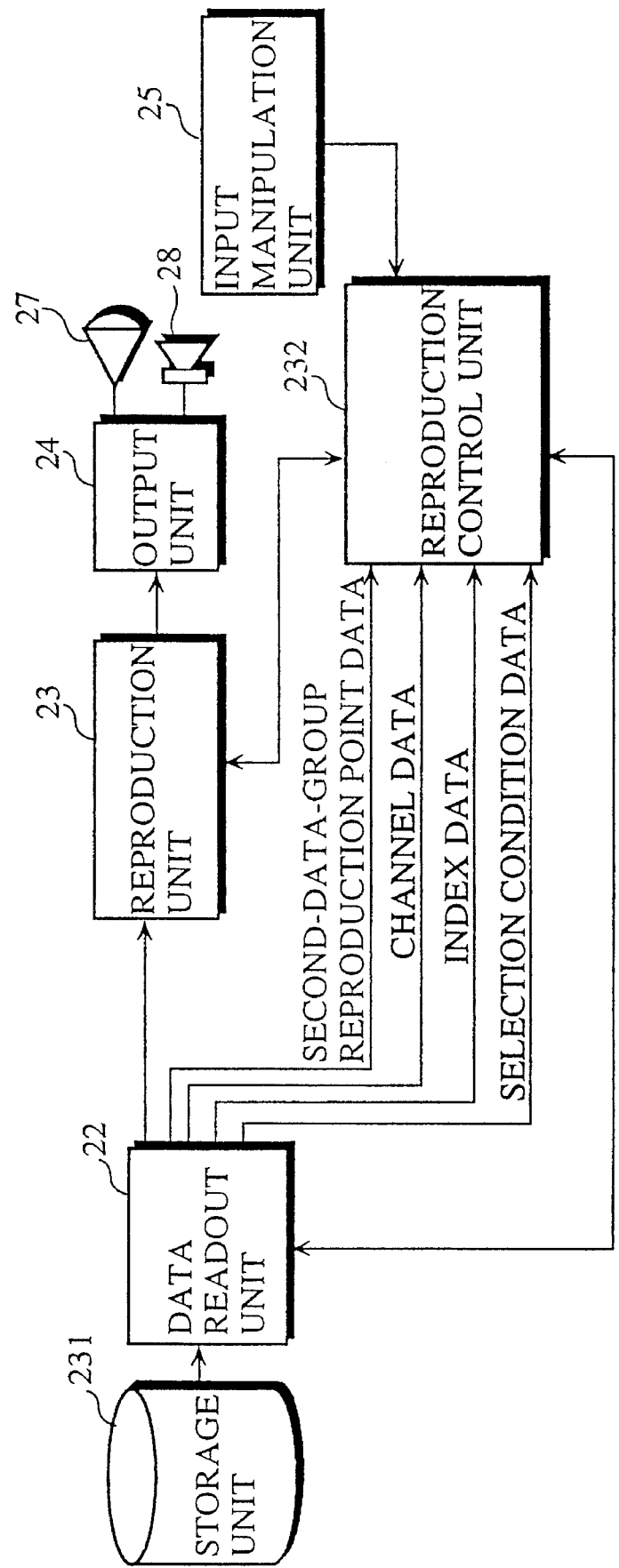
FIG. 23 is a view showing a structure of a data reproduction apparatus in accordance with a third embodiment of the present invention.

FIG. 23 is a view showing the structure of a data reproduction apparatus in accordance with the third embodiment. The data reproduction apparatus is of the same structure as the first embodiment except that the storage unit 21 is replaced with a storage unit 213, and the reproduction control unit 26 is replaced with the reproduction control unit 232. Hereinafter, like components are labeled with like reference numerals with respect to the first embodiment, and the description of these components is not repeated.

The storage unit 231 consists of a data recording medium, or namely a CD-ROM, and a CD-ROM driving system. The CD-ROM of the storage unit 231 stores two kinds of element data in the form of the digital data: primary data, or a plurality of element data and management data related to the primary data. One element data are the minimum unit for reproduction, consisting of sound elements, still photograph elements, and text elements, and optionally moving picture elements. The element data are divided into a first data group and a second data group depending on the contents thereof.

The management data consist of the index data, channel data, second-data-group reproduction point data, and selection condition data. The index data, channel data, and second-data-group reproduction point data are of the same structure as those in the first embodiment, and the explanation thereof is omitted. The selection condition data specifies the number of the element data of the second data group to be reproduced at the reproduction point.

Figure 24:
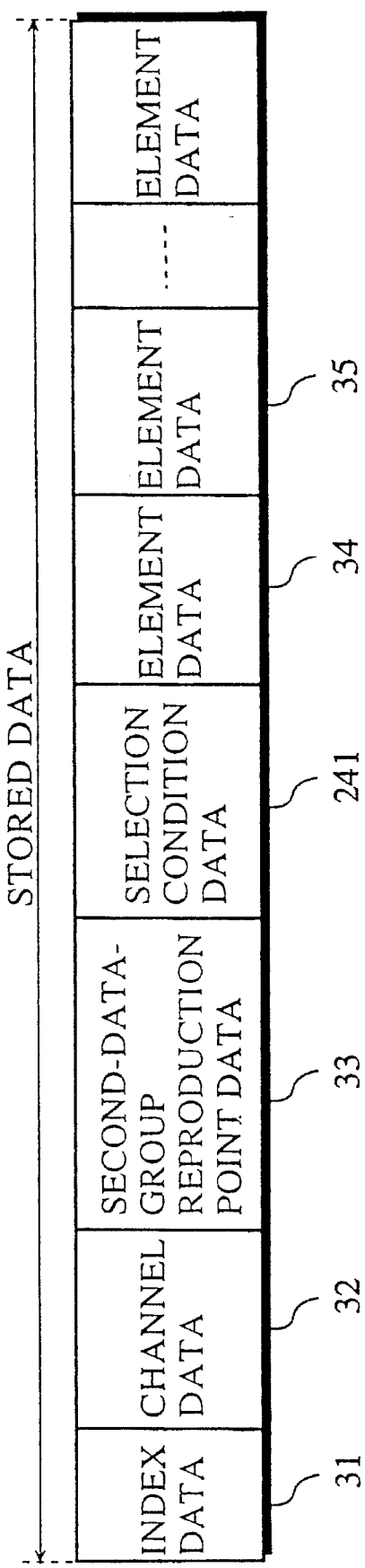
FIG. 24 is a view showing a structure of data stored in a storage unit in the third embodiment.

FIG. 24 is a view showing the structure of the data stored in the storage unit 231. The stored delta consist of the index data 31, channel data 32, second-data-group reproduction staring point data 33, and selection condition data 241, element data 34, 35, . . . .

FIG. 25 is a view showing the structure of the selection condition data 241, which consist of a plurality of entries 251, 252, . . . . Each entry stores the reproduction point identifier 104 and the number of reproduction times. The reproduction point identifier 104 indicates the reproduction point of the element data of the second group contained in the second-data-group reproduction point data 33 (FIG. 10) explained in the first embodiment. The number of reproduction times indicates the number of the element data of the second data group to be reproduced at the reproduction point indicated by the reproduction point identifier 104.

Given a reproduction point identifier c1 and the number of reproduction times "3" (not shown), three element data of the second data group are reproduced at the reproduction point for the element data of the second data group identified by the reproduction point identifier c1.

The reproduction control unit 232 consists of a microprocessor, a ROM, and a RAM storing an operation program.

Figure 26:
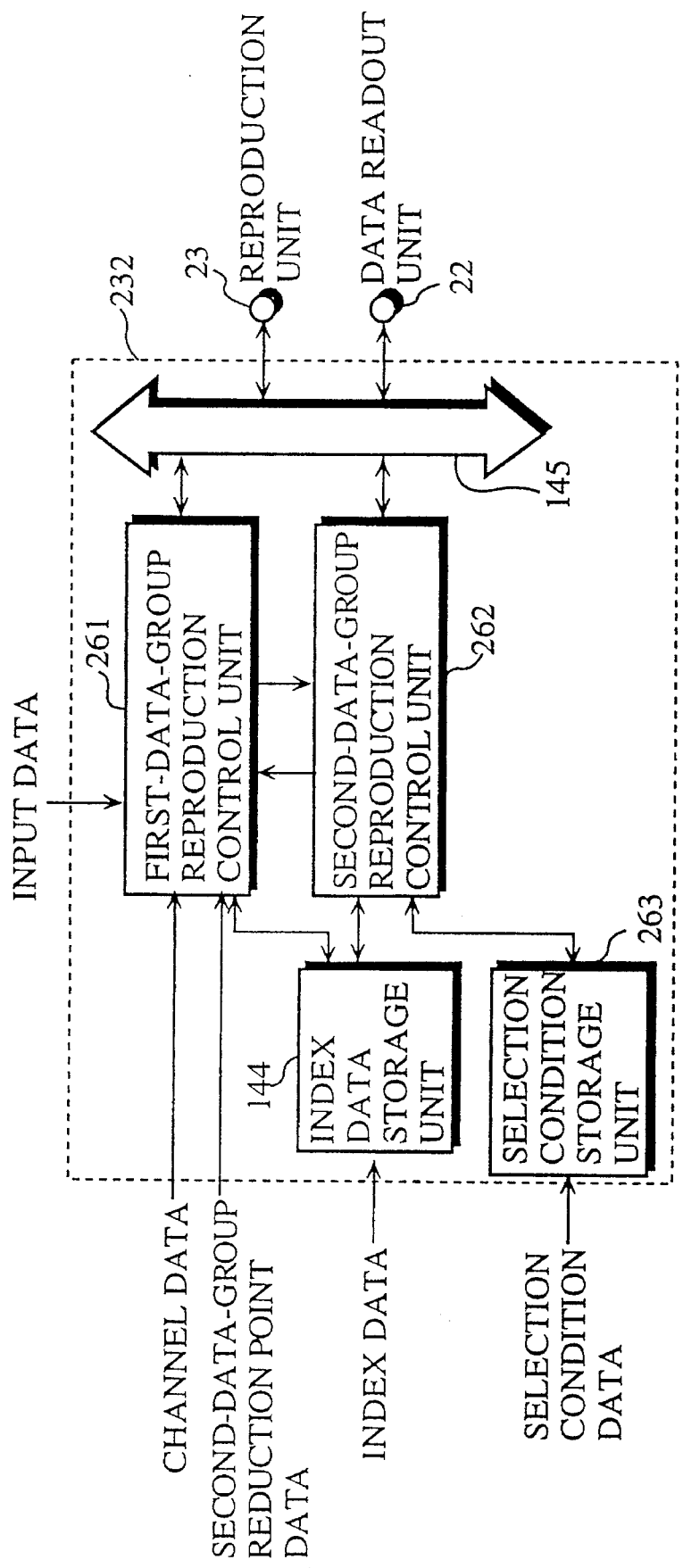
FIG. 26 is a detailed view showing a structure of a reproduction control unit in the third embodiment.

FIG. 26 is a view showing the detailed structure of the reproduction control unit 232, which includes a first-data-group reproduction control unit 261, a second-data-group reproduction control unit 262, a selection condition data storage unit 263, and the index data storage unit 144; the first two components are connected to the reproduction unit 23 and data readout unit 22 by means of the data bus 145.

The first-data-group reproduction control unit 261, compared with the first-data-group reproduction control unit 141 in the first embodiment, additionally outputs control data to the data readout unit 22 to read out the selection condition data (the management data) at the initialization, and outputs an identifier specifying the reproduction point to the second-data-group reproduction control unit 262 upon judging the reproduction point of the element data of the second data group.

The second-data-group reproduction control unit 262 is activated by the first-data-group reproduction control unit 261, and receives the reproduction point identifier 104. The second-data-group reproduction control unit 262 reads out the entries 251, 252, . . . of the selection condition data 241 stored in the selection condition data storage unit 263 to extract the number of reproduction times 253 corresponding to the reproduction point identifier 104. Subsequently, the second-data-group reproduction control unit 262 selects a specified number of the element data identifiers: 46 identified by the second data group code 45; the number is identical with the extracted number of reproduction times 253 from the index data stored in the index data storage unit 144. The second-data-group reproduction control unit 262 also extracts the address value 47 corresponding to the selected element data identifiers 46 to output the same successively to the data readout unit 22, and judges whether or not the element data in a matching number of the number of reproduction times 253 have been reproduced. If the production has been completed, the second-data-group reproduction control unit 262 outputs control data to the first-data-group reproduction control unit 261 to terminate the reproduction of the element data of the second data group.

The selection condition data storage unit 263 stores the selection condition data 241, which are read out from the storage unit 231 by means of the data readout unit 22.

Figure 27:
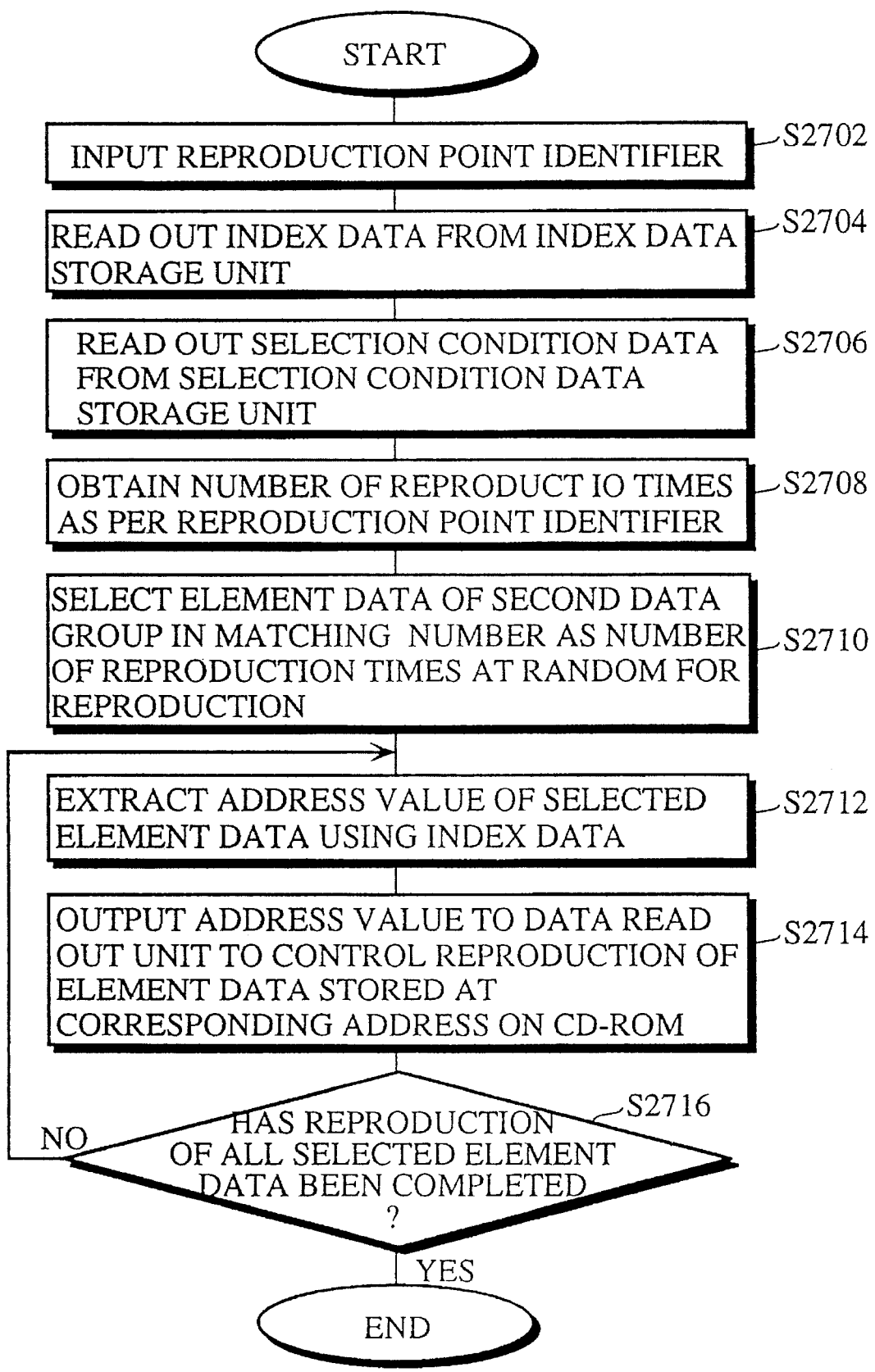
FIG. 27 is a flowchart detailing an operation of the reproduction control unit in the third embodiment.

Next, the operation of the data reproduction apparatus of the third embodiment will be explained. The operation of the data reproduction apparatus of the second embodiment is also detailed by the flowchart in FIG. 15 except for the sub-routine of S1518 (S1602 through 1610). Thus, only the sub-routine will be explained with reference to the flowchart in FIG. 27.

The second-data-group reproduction control unit 262 receives the reproduction point identifier 104 from the first-data-group reproduction control unit 261 and starts the operation (S2702).

The second-data-group reproduction control unit 262 reads out the index data 31 from the index data storage unit 144 and the selection condition data 241 from the selection condition data storage unit 263 (S2704, S2706).

Then, the second-data-group reproduction control unit 262 extracts the number of reproduction times 253 that corresponds to the reproduction point identifier 104 from the selection condition data 241 (S2708).

Accordingly, the second-data-group reproduction control unit 262 extracts a plurality of the element data identifiers 46 of the second data group from the index data 31, and further selects a specified number of the element data identifiers 46; the number is identical with the number of reproduction times 253 (S2710).

Subsequently, the second-data-group reproduction control unit 262 refers to the index data 31 to extract the address value 47 that corresponds to the selected element data identifiers 46 (S2712), and outputs the same to the data readout unit 22 to control the reproduction of the element data stored on the CD-ROM (S2714).

The second-data-group reproduction control unit 262 checks whether all the selected element data have been reproduced (S2716). When the reproduction has been completed, the second-data-group reproduction control unit 262 proceeds to S1516 as does the second-data-group reproduction control unit 142; otherwise the second-data-group reproduction control unit 262 proceeds to S2712.

By having various scene files as the element data of the first data group, advertisements as those of the second data group, and the number of reproduction times as the selection condition of the element data at each reproduction point, the number of reproduction times is set directly proportional to the frequency of individual reproduction channels, making it possible to increase the frequency of the advertisements to appear.

FOURTH EMBODIMENT

Figure 28:
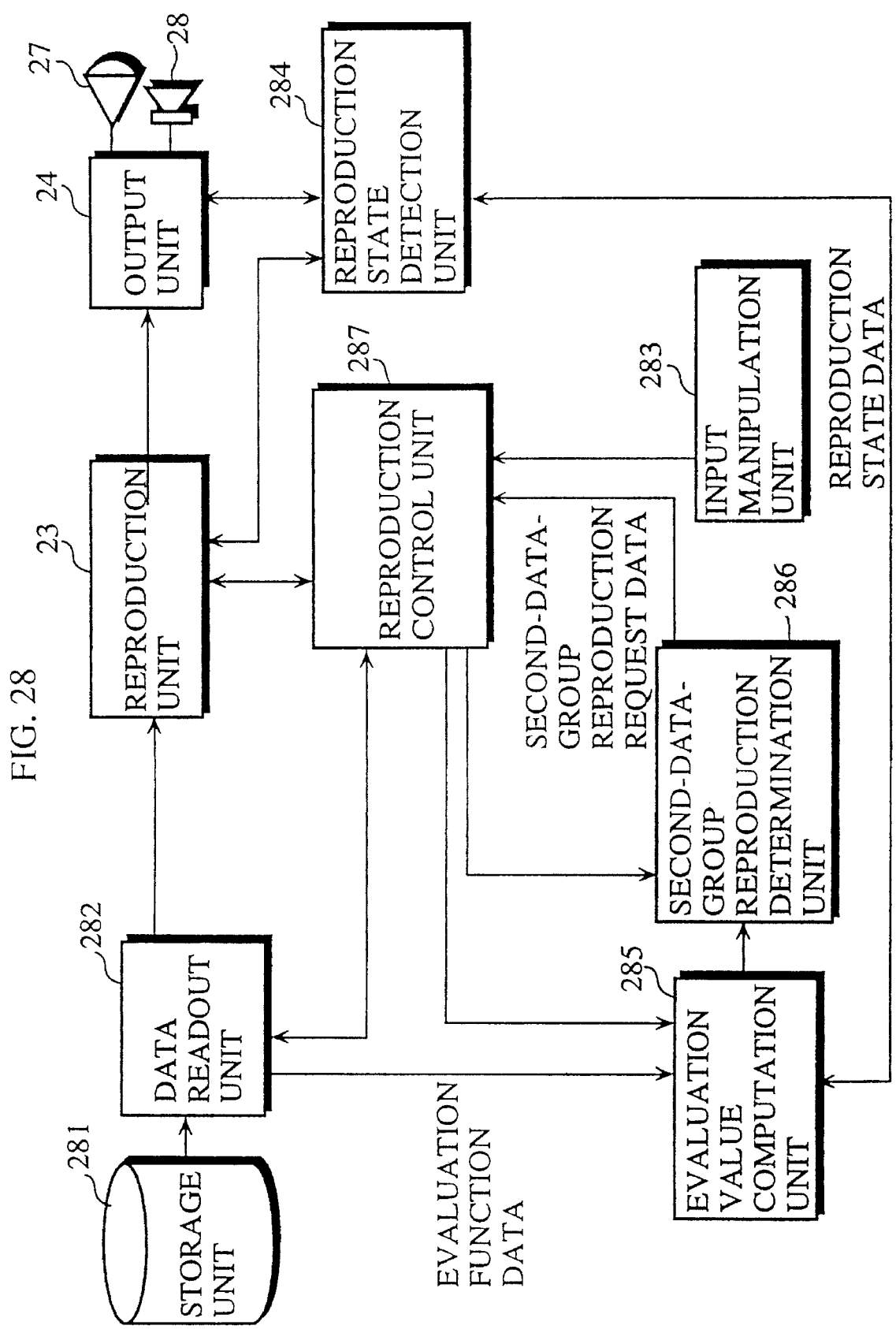
FIG. 28 is a view showing a structure of a data reproduction apparatus in accordance with a fourth embodiment of the present invention.

FIG. 28 is a view showing the structure of a data reproduction apparatus in accordance with the fourth embodiment of the present invention. The data reproduction apparatus comprises a storage unit 281, a data readout unit 282, a reproduction unit 23, an output unit 24, an input manipulation unit 283, a reproduction state detection unit 284, an evaluation value computation unit 285, a second-data-group reproduction determination unit 286, and a reproduction control unit 287. The reproduction unit 23 and output unit 24 are of the same structure of those in the first embodiment, and the explanation thereof is omitted.

The storage unit 281 consists of a data recording medium, or namely a CD-ROM, and a CD-ROM driving system. The CD-ROM of the storage unit 281 stores two kinds of data in the form of the digital data: primary data, or a plurality of element data and management data related to the primary data. One element data are the minimum unit for reproduction, and divided into a first data group and a second data group depending on the contents thereof.

The management data are of the same structure as those in the first embodiment, and the explanation thereof is omitted.

Figure 29:
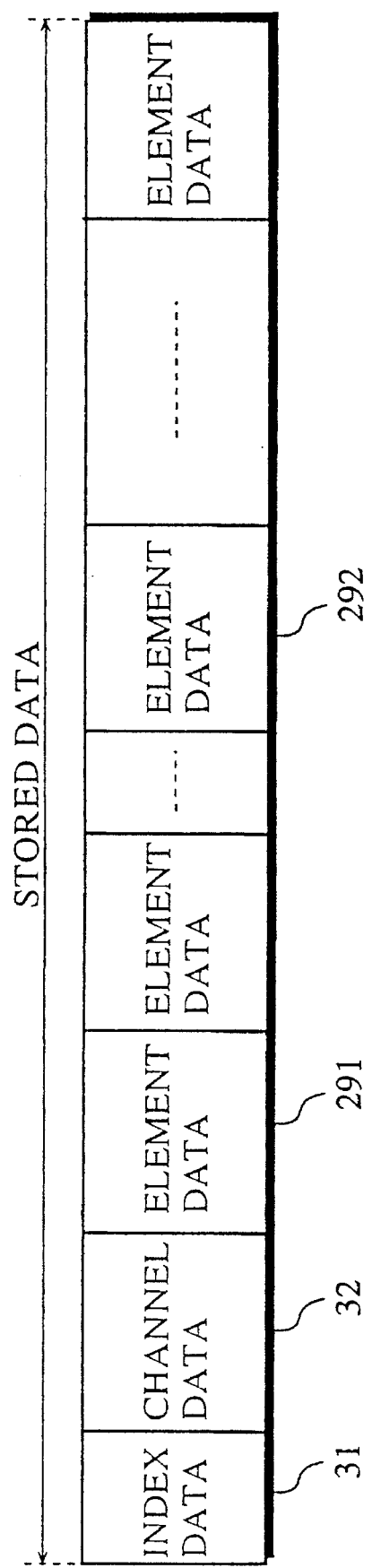
FIG. 29 is a view showing a structure of data stored in a storage unit in the fourth embodiment.

FIG. 29 is a view showing the structure of the data stored in the storage unit 281. The stored data 281 consist of the index data 31, channel data 32, and element data 291, ..., 292, ....

Figure 30:
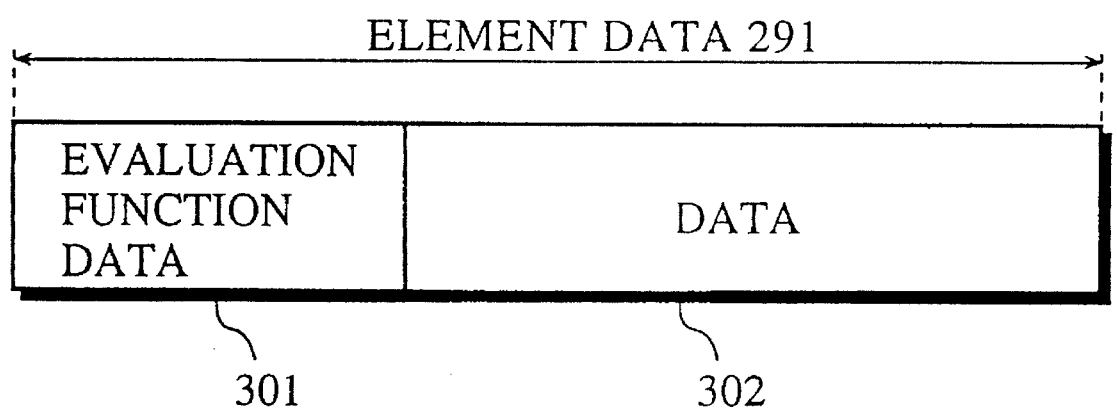
FIG. 30 is a view showing a structure of element data in the fourth embodiment.

FIG. 30 is a view showing the structure of the element data 291 of the first data group, consisting of evaluation function data 301 and data 302. The element data 291, ... of the first data group include the evaluation function data 301, while the element data 292 ... of the second data group include only the data 302.

The evaluation function data 301 are in effect a function using a reproduction time of the element data as its parameter, and used to compute an evaluation value for the judgment of whether or not the element data 292, ... of the second data group are to be reproduced, while the data 302 include sound elements, still photograph elements, and text elements, and optionally moving picture elements.

More precisely, the evaluation function data 301 include four evaluation functions as is shown in FIG. 31: an equal-plus-value evaluation function 311 defined by $y=\alpha t+\beta$, a converge-plus-value evaluation function 312 defined by $y=t^{1/\alpha}+\beta$, an equal-minus-value evaluation function 313 defined by $y=-(\alpha t+\beta)$, and a converge-minus-value evaluation function 314 defined by $y=-(t^{1/\alpha}+\beta)$, where $\alpha$ and $\beta$ are constant positive integers, t is a parameter, and y is an evaluation value. The parameter t shows the period of time (seconds) from the start to end of the output of the element data corresponding to the evaluation function. For example, when the element data of the equal-plus-value evaluation function 311 are outputted for ten seconds, then y is defied as $y=10\alpha+\beta$.

FIG. 32 is a graph 321 of the equal-plus-value evaluation function 311, time t is given to the x-axis and evaluation value y to the y-axis.

Figure 34:
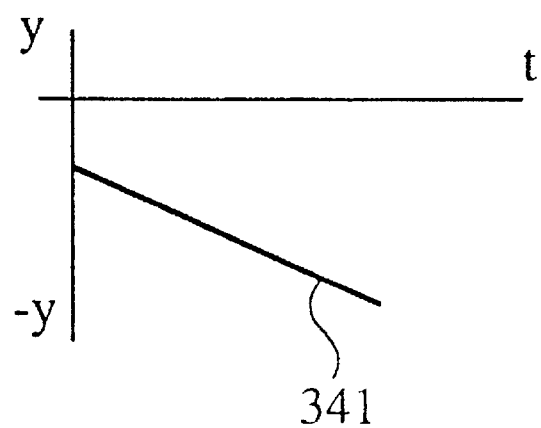
FIG. 34 is a graph showing an equal-minus-value evaluation function in the fourth embodiment.
Figure 35:
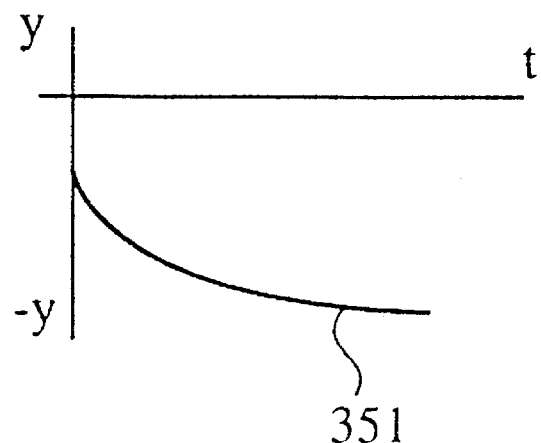
FIG. 35 is a graph showing a converge-minus-value evaluation function in the fourth embodiment.

Similarly, FIG. 33 is a graph 331 of the converge-plus-value evaluation function 312; FIG. 34 is a graph 341 of the equal-minus-value evaluation function 313; and FIG. 35 is a graph 351 of the converge-minus-value evaluation function 314.

With the equal-plus-value evaluation function 311, the evaluation value increases directly proportional to the reproduction time for the corresponding element data. With converge-plus-value evaluation function 312, the evaluation value converges to a certain value after a predetermined reproduction time. With the equal-minus-value evaluation function 313, the evaluation value varies in the same manner as the equal-plus-value evaluation function 311, albeit in the reversed direction; the evaluation value decreases directly proportional to the reproduction time. With the converge-minus-value evaluation function 314, the evaluation value converges in the same manner as the converge-plus-value evaluation function 314, albeit in the reversed direction; the evaluation value converges into a certain negative value after a predetermined reproduction time.

Figure 36:
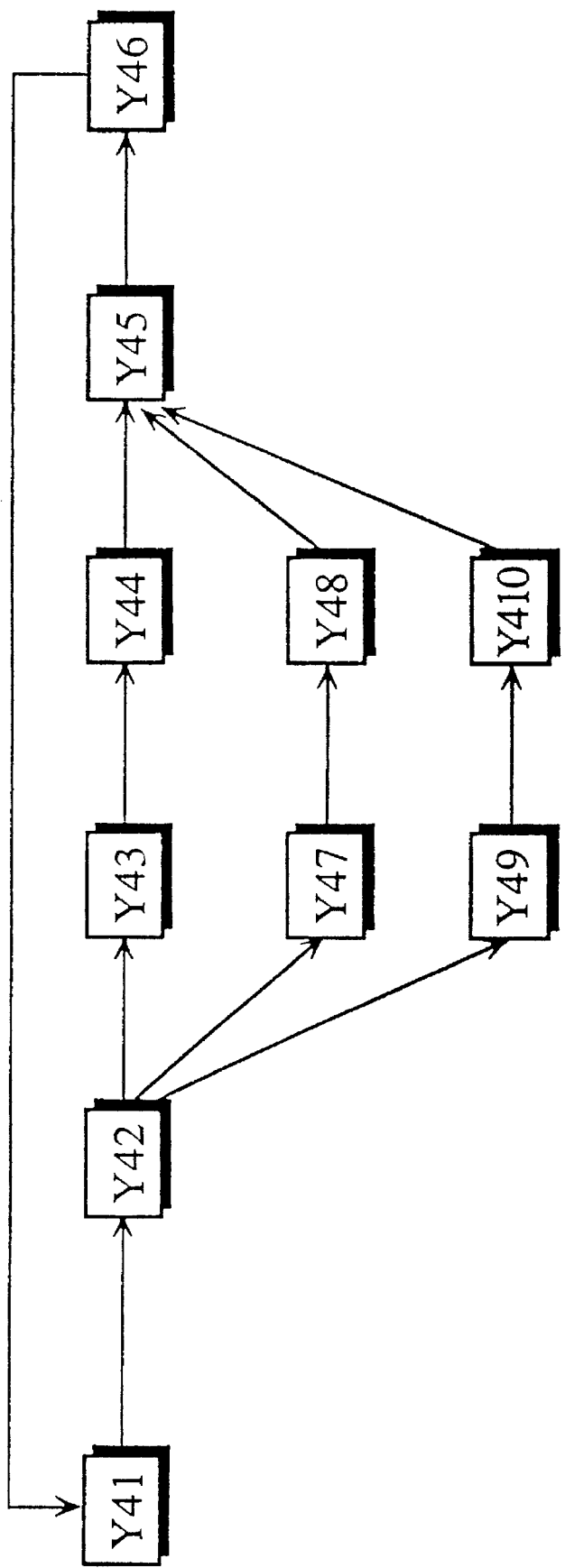
FIG. 36 is a view explaining a order how element data are reproduced in the fourth embodiment.

FIG. 36 is a view schematically showing the reproduction channels of the element data of the first data group indicated by the channel data 32 using the element data identifiers. Hereinafter, the element data identified by the element data identifier Y41 are referred to as the element data Y41, and the others are also referred to in the same manner.

FIG. 37 shows an example of the evaluation function data of the element data Y41 through Y410. For example, the element data Y41 hold the equal-plus-value evaluation function 311 defined by $y=t+10$.

The data readout unit 282 receives control data to read out the management data from the reproduction control unit 287, and accordingly reads out the index data 31 and channel data 32 stored in the storage unit 281 in the form of the digital data to output the same to the reproduction control unit 287.

Upon receipt of the address value 47 from the reproduction control unit 287, the data readout unit 282 reads out the element data stored at the corresponding address on the CD-ROM of the storage unit 281, and separates the element data to output the number of evaluation data 301 to the evaluation value computation unit 285, and the data 302 to the reproduction unit 23.

The reproduction unit 23 receives the digital data, or the data 302 of the element data, from the data readout unit 22, and separates the sound, still photograph, and text data to process each of the same in a predetermined manner through buffering to output the resulting data to the output unit 24. To be more specific, the text data are developed into an appropriate font, rendered together with the still photograph data, and converted into the video digital data. The reproduction unit 23 linear quantalizes the sound data to convert the same into the video digital data. Upon input of a suspension instruction of the reproduction from the reproduction control unit 287, the reproduction unit 23 stores the video digital data and sound digital data into a video memory and a sound memory, and reproduction control unit 287 outputs the stored video digital data and sound digital data to the output unit 24 upon receipt of a reproduction resume instruction.

The output unit 24 converts the input video digital data into a video output signal (video analog signal), and the input sound digital data into a sound output signal (sound analog signal) to output the resulting video signal and output signal by means of the display screen 27 and speaker 28, respectively. The output unit 24 outputs only the video data as the still photograph when the reproduction unit 23 receives the reproduction suspension instruction.

The input manipulation unit 283 consists of manipulation buttons and instrument such as a mouse, and is used to receive user's instruction to specify a video display area shown on the display screen 27 for the data such as the table of contents, and outputs the location coordinate of the video display area to the reproduction control unit 287. Also, the input manipulation unit 283 receives the reproduction suspension instruction or reproduction resume instruction to output the same to the reproduction control unit 287 as input data.

The reproduction control unit 287 consists of a microprocessor, a ROM, and a RAM storing an operation program. When the data reproduction apparatus is turned on, the reproduction control unit 287 initializes a buffer installed therein, the evaluation value computation unit 285, second-data-group reproduction determination unit 286, while outputting control data to the data readout unit 282 to read out the management data. Upon receipt of the channel data 32 and index data 31 from the data readout unit 282, the reproduction control unit 287 stores the same into the self-installed buffer. The reproduction control unit 287 also extracts the entry 61 of the reproduction order data 66 identified by the reproduction order identifier 65 for initialization as the data for the reproduction channel from the channel data 32 stored in the buffer. Accordingly, the reproduction control unit 287 determines the element data to be reproduced as per the reproduction order 75 (FIG. 7) of the reproduction order data 66 identified by the reproduction order identifier 65. The reproduction control unit 287 extracts the address value 47, which corresponds to the element data identifier 46 placed first in the determined reproduction order 75 with reference to the index data 31.

The reproduction control unit 287 outputs the extracted address value to the data readout unit 282, and judges whether or not the reproduction suspension instruction has been inputted.

The reproduction control unit 287 outputs the reproduction suspension instruction to the reproduction unit 23 upon judgement of the input of the reproduction suspension instruction, while outputting the reproduction resume instruction to the reproduction unit 23 upon receipt of the reproduction resume instruction from the input manipulation unit 283.

As well, the reproduction control unit 287 outputs element data evaluation request data to the evaluation value computation unit 285 each time the output with respect to the reproduction of one element data has been completed.

The reproduction control unit 287 judges whether or not the second-data-group reproduction request data are inputted from the second-data-group reproduction determination unit 286. Upon judgment of the input of the second-data-group reproduction request data, the reproduction control unit 287 reproduces the element data of the second data group in the same manner as the reproduction control unit 26 of the first embodiment. When the reproduction of the element data of the second data group has been completed, the reproduction control unit 287 output reset data to the second-data-group reproduction determination unit 286.

Upon judgment of no input of the reproduction request data of the second data group, the reproduction control unit 287 further judges whether the element data of the first data group being or previously reproduced in the end of the reproduction order data 66 when the reproduction of the element data of the second group has been completed. When the reproduction control unit 287 judges the concerned element data are placed last in the order, it proceeds to the following order; otherwise, the reproduction control unit 287 judges whether the reproduction has been completed or not. When the reproduction has not been completed, the reproduction control unit 287 operates in the same manner as the reproduction control unit 26 in the first embodiment to determine the reproduction channel to the branched element data.

The reproduction state detection unit 284 detects the reproduction state of the element data by the reproduction unit 23 and output unit 24, and outputs the period of time from the start to end of the element data output to the evaluation value computation unit 285 as reproduction state data. The period of time includes an idle time between the end of one element data and the start of the following element data, for example, when the user inputs the reproduction suspension instruction. In this case, the display screen 27 of the output unit 24 displays the video data of the element data in the form of the still photograph.

The evaluation computation unit 285 receives the evaluation function data 301 from the data readout unit 282. When the evaluation computation unit 285 receives the element data evaluation request data form the reproduction control unit 287, and reproduction state data from the reproduction state detection unit 284, then it computes the evaluation value of the element data as per the evaluation function indicated by the evaluation function data, outputting the resulting evaluation value to the second-data-group reproduction determination unit 286.

For example, let the element data of the first data group be reproduced through the reproduction channel shown in FIG. 36.

The evaluation computation unit 285, which stores the evaluation function data, $y=t+10$, of the input element data Y41 from the data readout unit 282, receives reproduction state data from the reproduction state detection unit 284; the reproduction state data indicate that the reproduction time from the start of the output of the element data Y41 to the start of the output of the element data Y42 is ten seconds. Thus, the evaluation computation unit 285 substitutes "10" into the evaluation function, $y=t+10$, and obtains an evaluation value "20", outputting the same to the second-data-group reproduction determination unit 286.

Similarly, upon receipt of a value "25" as the reproduction state data, the evaluation computation unit 285 substitutes "25" into the evaluation function, $y=t^{1/2}$ and obtains the evaluation value, $y=5$, outputting the same to the second-data-group reproduction determination unit 286.

When the user selects the element data Y47 as the branched data element after the reproduction of the element data Y42, then the element data Y47-Y48-Y45-Y46 are successively reproduced.

Accordingly, the evaluation computation unit 285 outputs the evaluation values "45", "−23", "25", and "30" to the second-data-reproduction determination unit 286.

Upon input of the evaluation value from the evaluation value computation unit 285, the second-data-group reproduction determination unit 286 adds up the evaluation values. When the resulting value exceeds a predetermined threshold, the evaluation value computation unit 285 outputs the second-data-group reproduction request data to the reproduction control unit 287. Also, upon receipt of an initial value "0" as the total of the evaluation values due to the reproduction, or reset data from the reproduction control unit 287, the second-data-group reproduction determination unit 286 resets the total of the evaluation values to the initial value "0" as well.

When the element data Y41-Y42-Y47-Y48-Y45-Y46 are successively reproduced through the reproduction channel as shown in FIG. 36, the second-data-group reproduction determination unit 286 computes the total of the evaluation values 381. Here, since the evaluation value of the element data Y48 exhibits a negative value, the resulting total of the evaluation values 381 is reduced to "47" from "70".

When the predetermined threshold is "100", the second-data-group reproduction determination unit 286 outputs the second-data-group reproduction request to the reproduction control unit 287 when the reproduction of the element data Y47 has been completed; for the total of the evaluation value 381 has become "102" at this point.

Like in the first embodiment, after the element data of the second group are reproduced, the second-data-group reproduction determination unit 286 resets the total of the evaluation value 381 to the initial value "0". When the element data Y41 are reproduced again after the element data Y46 and the user suspends the reproduction, the evaluation value becomes "60" when the reproduction time reaches fifty seconds, making the total of the evaluation values "60" as well (FIG. 38). When the element data Y42-Y43-Y44 are reproduced subsequently, the total of the evaluation values reaches "115" at the end of the reproduction of the element data Y44, exceeding the predetermined threshold "100". Thus, the second-data-group reproduction determination unit 286 outputs the second-data-group reproduction request data to the reproduction control unit 287.

Figure 39:
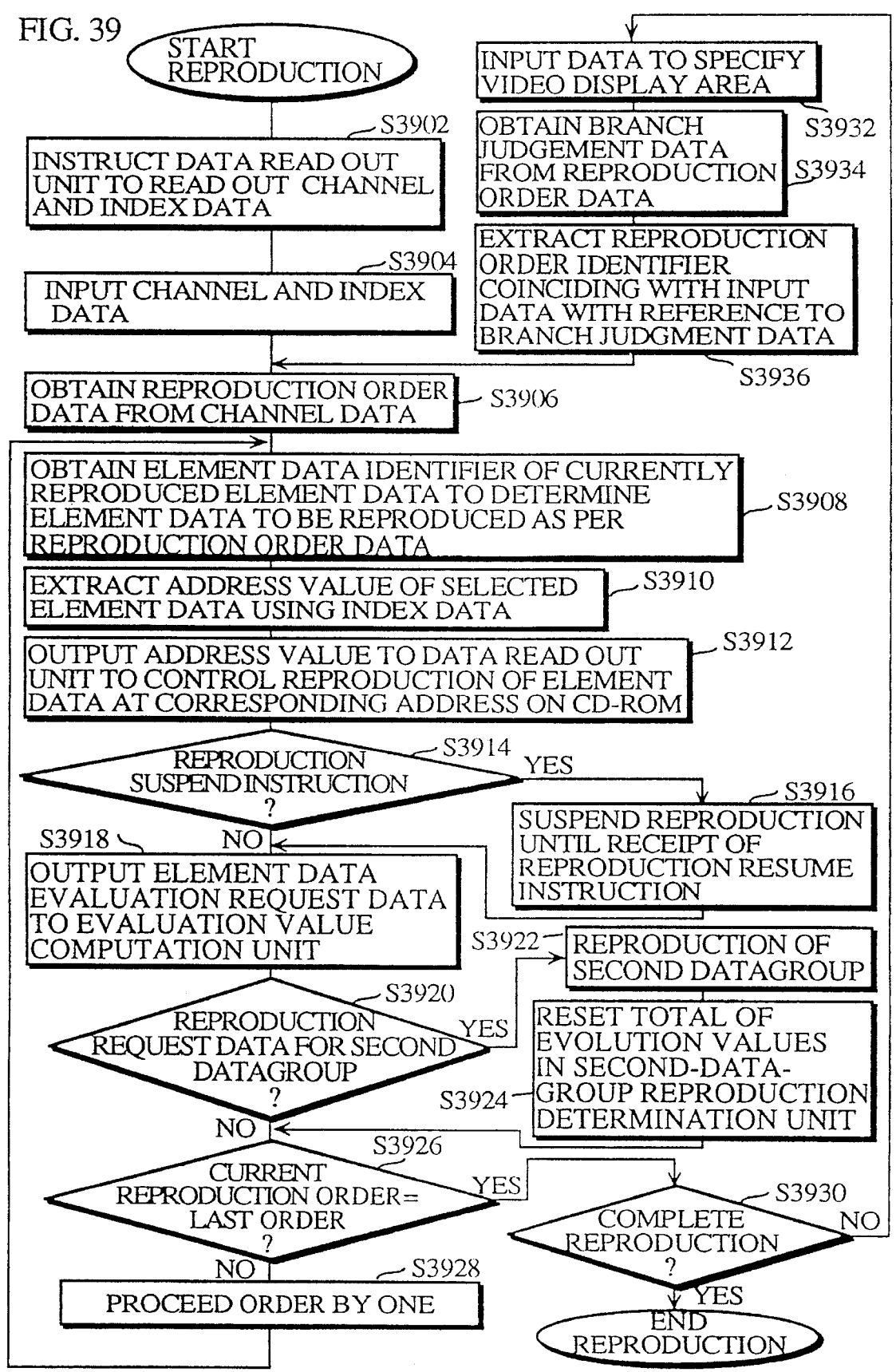
FIG. 39 is a flowchart detailing an operation of a reproduction control unit in the fourth embodiment.
Figure 40:
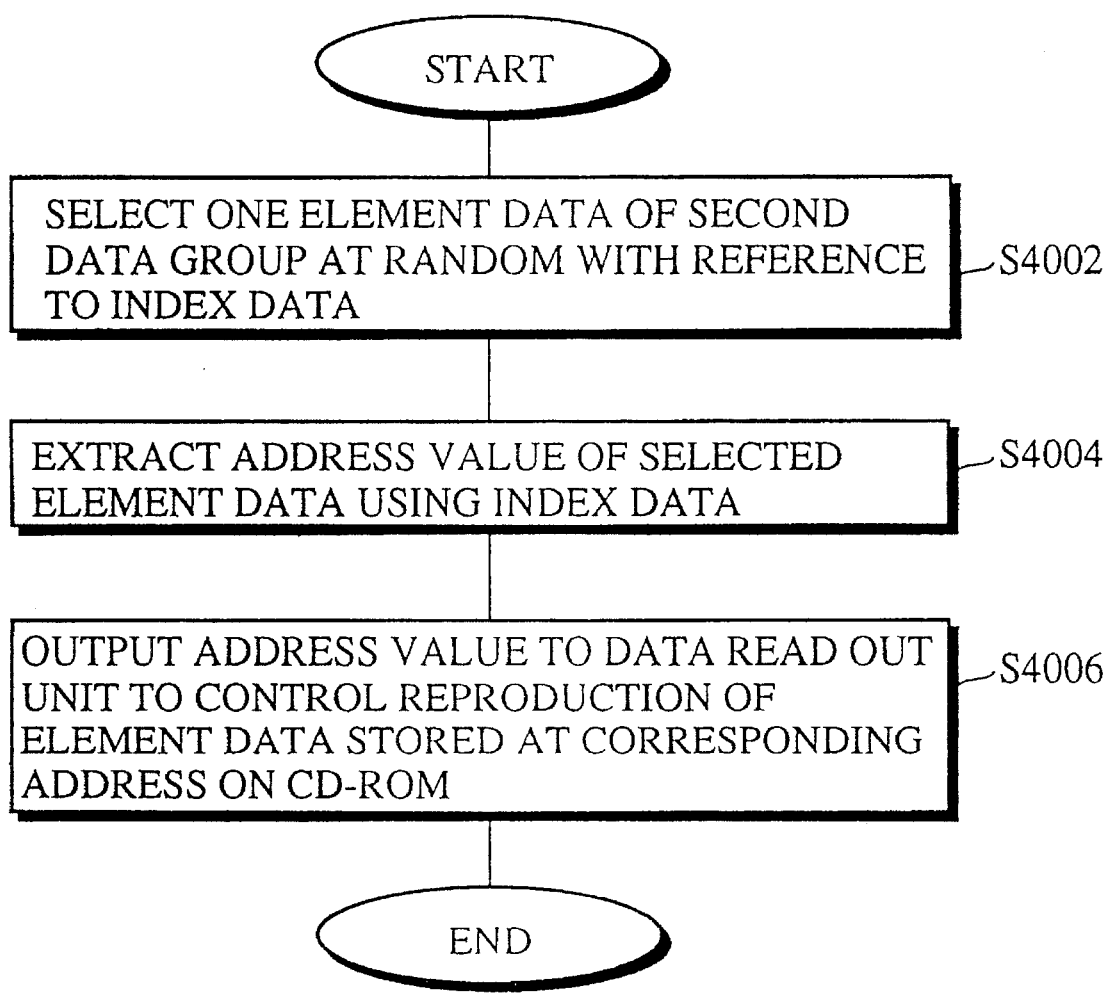
FIG. 40 is a flowchart detailing an operation of the reproduction control unit in the fourth embodiment.

Next, the operation of the data reproduction apparatus of the fourth embodiment will be explained with referring to the flowcharts in FIGS. 39 and 40.

When the data reproduction apparatus is turned on, the reproduction starts. The reproduction control unit 287 initializes a buffer installed therein, the evaluation value computation unit 285, and second-data-group reproduction determination unit 286, while outputting control data to the data readout unit 282 to read out the channel data 32 and index data 31 (S3902). The reproduction control unit 287 receives the channel data 32 and index data 31 from the data readout unit 282 (S3904), accordingly obtains the reproduction order data 66 from the channel data 32 (S3906).

The reproduction control unit 287 obtains the element data identifier 46 of the reproduction order currently being reproduced to determine the element data to be reproduced (S3098). The reproduction control unit 287 extracts the address value 47 of the determined element data from the index data 31 (S3910). Then, the reproduction control unit 287 outputs the address value 47 to the data readout unit 282 to control the reproduction of the element data stored at the corresponding address on the CD-ROM of the storage unit 281 (S3912). Subsequent to the reproduction of the element data, the reproduction control unit 287 checks whether or not there exists input data specifying the reproduction suspension (S3914). When there exist such input data, the reproduction control unit 287 suspends the reproduction of the element data until it receives the reproduction resume instruction (S3916).

When there exists no such input data, or the reproduction resume instruction is received, the reproduction control unit 287 outputs the element data evaluation request data to the evaluation value computation unit 285 when the reproduction has been completed (S3918).

The reproduction control unit 287 checks whether it has received the second-data-group reproduction request data from the second-data-group reproduction determination unit 286 after the output of the element data evaluation request data (S3920). When the reproduction control unit 287 has received the second-data-group reproduction request data, it judges that current reproduction order is the reproduction point of the element data of the second data group, and reproduces the element data of the second data group (S3922). S3922 is detailed by the sub-routine in FIG. 40, S4002 through S4006.

More precisely, the reproduction control unit 287 selects one element data out of a plurality of the element data identified as to be the second data group by the index data 31 at random as per a predetermined procedure (S4002), and extracts the address value 47 of the element data which are determined to be reproduced by the index data 31 (S4004). Then, the reproduction control unit 287 outputs the address value 47 to the data readout unit 22 to control the reproduction of the element data stored at the corresponding address on the CD-ROM (S4006), and proceeds to S3924.

The reproduction control unit 287 inputs the reset data to the second-data-group reproduction determination unit 286 to reset the total of the evaluation values to "0"(S3924).

When the reproduction control unit 287 has not received the second-data-group reproduction request data, it checks whether or not the currently reproduced element data are placed last in the order (S3926).

When the currently reproduced element data are not placed last in the order, the reproduction control unit 287 terminates the reproduction operation; otherwise the reproduction control unit 287 proceeds to the following order (S3928) to return to S3908 (S3930)

The reproduction control unit 287 receives the unit data specifying the video display area from the input manipulation unit 283 and obtains the branch judgment data 77 from the reproduction order data 66 (S3934). Then, the reproduction control unit 287 extracts the reproduction order identifier 66, which is determined by the display area data 85 of the branch judgment data 77 and the input data (S3936) to proceed to S3906.

Assume that the element data of the first data group are various scene files and those of the second data group are the advertisement data, and the scene files include tourist's guide scene files containing the travel information for tourists to Hawaii, Los Angeles, New York, etc., photogravure scene files, advertisement scene files including both the sightseeing information and advertisement, and the table-of-contents scene files. Further, assume that the converge-plus-value evaluation function 312 is given to the tourist's guide scene files, the equal-plus-value evaluation function 311 is given to the photogravure scene files, the equal-minus-value evaluation function 313 is given to the advertisement scene files, and the evaluation function corresponds to nil is given to the table-of-contents scene file.

Then, since the reader will benefit as much whether he reads the tourist's guide scene files quickly or slowly pausing for a number of times, the chances for the reader to see the advertisements are equal regardless of the time he spent on reading.

On the other hand, longer the reader watches the photogravure, more the reader will benefit. Thus, the number of the advertisements to be reproduced increases when he watching the photogravure scene files slowly pausing for a number of times compared to when watching the same quickly.

With respect to the advertisement scene files, the chances for the reader to see the advertisements of the second data element will reduce depending on the period for the reader reading the advertisement scene files.

Further, it is possible not to reproduce the advertisement data of the second data group at all when the reader is searching for a particular article (element data) or reproducing the table of contents; for they are not directly related to the reproduction of the particular element data.

The mouse is used as the input manipulation unit in the foregoing embodiments. However, the input manipulation unit can be any pointing device such as a pad or truck ball besides the mouse.

The storage unit consists of the CD-ROM and its driving system in the foregoing embodiments. However, it may consist of an optical magnetic disc, a magnetic disc, or a magnetic disc and their respective driving systems as long as the stored data can be read out from a specified address.

The data readout unit reads out the data by directly accessing to the storage unit in the foregoing embodiments. However, the access may be realized by means of a network such as an ISDN or broadcast. In case of the broadcast, the frequency that carries the desired data will be specified instated of the address.

The number of the selected element data of the second data group is the selection condition data in the third embodiment. However, the selection condition data may specify either a random or sequential selection. In the former, the element data of the second data group are selected at random, while in the latter, the element of the second group data are selected sequentially.

Further, the reproduction state data means the reproduction time from the start of the reproduction of one element data to the start of the reproduction of following element data in the fourth embodiment, they are not limited to the reproduction time. They may be the number of the times of the reproduction for one element data.

The reproduction history storage unit 143 of the first embodiment can be installed in the data reproduction apparatus of the second, third, and fourth embodiment as well.

Although the present invention has been fully described by way of examples with reference to the accompanying drawings, it is to be noted that various changes and modifications will be apparent to those skilled in the art. Therefore, unless otherwise such changes and modifications depart from the scope of the present invention, they should be construed as being included therein.

What is claimed is:

1. A data reproduction apparatus comprising:

storage means for storing primary data, management data, channel data, and second-data-group reproduction print group data, said primary data being a plurality of element data, said management data including index data that divide said plurality of element data into a first data group and a second data group, said channel data indicating a reproduction order in said first data group, and said second-data-group reproduction point group data being management data for directing reproduction of the element data of said second data group within a reproduction channel of the element data of said first data group being reproduced, wherein the index data include an element data identifier identifying individual element data and an address value identifying a place in said storage means where each element data specified by a respective element data identifier are store, and wherein the channel data include reproduction order data formed of a reproduction order and an element data identifier, and a reproduction order identifier identifying individual reproduction order data;

management data readout and save means for reading out and saving the index data, the channel data from said storage means, and the second-data-group reproduction point group data stored in said storage means;

first-data-group-readout first direction means for outputting a first readout direction to readout the element data of said first data group as per the channel data saved in said management data readout and save means, including a first address value extraction unit for extracting the address value from the index data by referring to the reproduction order in the reproduction order data in the channel data and finding the element data identifier in the index data that coincides with the element data identifier in the index data that coincides with the element data identifier in the reproduction order data; and a first address indication unit for outputting the address value extracted by said first address value extraction unit to said first-data-group readout means, input manipulation means for accepting instruction input for directing a selection of a reproduction channel of the element data of said first data group;

first-data-group-readout second direction means for outputting a second readout direction to readout the element data of said first data group from said storage means as per the channel data specified by the instruction input from said input manipulation means, including a second address value extraction unit for extracting the address value from the index data by referring to the reproduction order in the reproduction order data in the channel data and finding the element data identifier in the index data that coincides with the element data identifier in the reproduction order data, the address value extracted by said first address value extraction unit being different from the address value extracted by said second address value extraction unit, and a second address indication unit for outputting the address value extracted by said second address value extraction unit to said first-data-group readout means;

first-data-group readout means for reading out the element data stored in said storage means as per one of the first and second readout direction;

first-data-group reproduction means for converting the element data readout by said first-data-group readout means into reproduction data and outputting resulting reproduction data;

first-data-group output means for converting the reproduction data inputted from said first-data-group reproduction means into output data and outputting resulting output data;

second-data-group output judgment means for judging whether it is adequate to output the element data of said second data group after the element data of said first data group is reproduced and judging the adequacy when the element data from said first-data-group output means coincide with the second-data-group reproduction point data saved in said management data readout and save means;

second-data-group readout means for reading out the element data of said second data group stored in said storage means when said second-data-group output judgment means judges adequacy of the output of the element data of said second data group;

second-data-group reproduction means for converting the element data read out by said second-data-group readout means into reproduction data and outputting resulting reproduction data; and second-data-group output means for converting the reproduction data inputted from said second-data-group reproduction means into output data and outputting resulting output data;

second-data-group reproduction history record means for recording the element data outputted from said second-data-group output means by means of an identifier identifying individual element data;

second-data-group selection means for firstly selecting the element data of said second data group whose identifier doe snot coincide with the identifiers stored in said second-data-group reproduction history record means, wherein said second-data group readout means reads out the element data selected by said second-data-group selection means from said storage means, wherein said input manipulation means accepts instruction input as to a reproduction channel by means of a location coordinate, and wherein branch judgment data are attached to the element data identifier in the reproduction order data when the reproduction order corresponding to said element data identifier is placed last in the order and a reproduction channel for the element data identified by said element data identifier has a branching point at an end thereof, and wherein said branch judgment data include a reproduction order identifier, and screen area data consisting of location coordinates, each indicating respective locations of a plurality of video data areas, each of said plurality of video data areas corresponding to the respective reproduction order identifiers, and wherein said first-data-group readout means includes:

a branch channel judgment unit for judging within of which said screen area data the location coordinate accepted by said input manipulation means exist;

a reproduction channel determination unit for determining a reproduction channel as per the reproduction order data identified by the reproduction order identifier corresponding to the screen area data judged by said branched channel judgment unit;

a third address value extraction unit for extracting the address value from the index data by referring to the reproduction order in the reproduction order data in the channel data and finding the element data identifier in the index data that coincides with the element data identifier in the reproduction order data, the address values extracted, respectively, by said first, second, and third address value extraction units being different; and an element data readout unit for reading out the element data from said storage means using the address value extracted by said third address value extraction unit.

2. The data reproduction apparatus of claim 1, wherein the second-data-group reproduction point group data include a reproduction order identifier and location data representing a reproduction order for each reproduction point forming a reproduction group, and wherein said second-data-group output judgment means includes:

a reproduction point judgment unit for judging whether the reproduction order identifier and the reproduction order of the element data outputted from said first-data-group output means coincide with the reproduction order identifier and the corresponding location data of any of the second-data-group reproduction point group data respectively; and a second-data-group-readout direction unit for outputting a direction to said second-data-group readout means to read out the element data based on judgment of element-data-identifier-coincidence by said reproduction point judgment unit.

3. The data reproduction apparatus of claim 2, wherein said index data further include a code identifier identifying one of said first data group and said second data group, and wherein said second-data-group selection means includes:

a not-reproduced-yet element data extraction unit for extracting the element data whose element data identifier does not correspond to the element data identifiers recorded in said second-data-group reproduction history data record means out of element data whose element data identifiers correspond to the code identifier identifying said second data group;

a random selection unit for selecting one element data from a plurality of element data extracted by said not-reproduced-yet element data extraction unit at random;

a fourth address value extraction unit for extracting the address value from the index data by referring to the reproduction order in the reproduction order data in the channel data and finding the element data identifier in the index data that coincides with the element data identifier in the reproduction order data, the address values extracted respectively by said first, second, third, and fourth address value extraction units being different; and a third address direction unit for outputting the address value extracted by said fourth address value extraction means to said second-data-group readout means.

4. The data reproduction apparatus of claim 3, wherein the element data of said first data group are scene files of electronic book data, and the element data of said second data group are advertisement data, the advertisement data being reproduced within a .reproduction channel of the scene files.

5. A data reproduction apparatus comprising:

storage means for storing primary data and management data, said primary data being a plurality of element data, said management data including index data that divide said plurality of element data into a first data group and a second data group, and channel data that indicate a reproduction order in said first data group;

management data readout and save means for reading out and saving the index data and the channel data from said storage means;

first-data-group-readout first direction means for outputting a first readout direction to readout the element data of said first data group as per the channel data saved in said management data readout and save means;

input manipulation means for accepting instruction input for directing a selection of a reproduction channel of the element data of said first data group;

first-data-group-readout second direction means for outputting a second readout direction to readout the element data of said first data group from said storage means as per the channel data specified by the instruction input from said input manipulation means;

first-data-group readout means for reading out the element data stored in said storage means as per one of the first and second readout direction;

first-data-group reproduction means for converting the element data readout by said first-data-group readout means into reproduction data and outputting resulting reproduction data;

first-data-group output means for converting the reproduction data inputted from said first-data-group reproduction means into output data and outputting resulting output data;

second-data-group output judgment means for judging whether it is adequate to output the element data of said second data group after the element data of said direct data group being reproduced;

second-data-group readout means for reading out the element data of said second data group stored in said storage means when said second-data-group output judgment means judges adequacy of the output of the element data of said second data group;

second-data-group reproduction means for converting the element data read out by said second-data-group readout means into reproduction data and outputting resulting reproduction data;

second-data-group output means for converting the reproduction data inputted from said second-data-group reproduction means into output data and outputting resulting output data, wherein said storage means further stores second-data-group reproduction point group data and data-group specifying data, said second-data-group reproduction point group data being management data for directing reproduction of the element data of the second data group within a reproduction channel of the element data of said first data group being reproduced, said data-group specifying data specifying the element data of said second data group pto be reproduced at a reproduction point as per certain classification, and wherein said management data readout and save means further reads out that saves the second-data-group reproduction point group data and data-group specifying data stored in said storage means, and wherein said second-data-group output judgement means judges adequacy when the element data outputted from said first-data-group output means coincide with the second-data-group reproduction point group data saved in said management data readout and save means, and wherein said second-data-group readout means reads out the element data of said second data group stored in said storage means as per said data-group specifying data upon adequacy judgment by said second-data-group output judgment means, wherein the index data include an element data identifier identifying individual element data and an address value identifying a place in said storage means where each element data specified by a respective element data identifier are stored, and wherein the channel data include reproduction order data formed of a reproduction order and an element data identifier, and a reproduction order identifier identifying individual reproduction order data, and wherein said first-data-group-readout first direction means includes:

a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by said first address value extraction unit to said first-data-group readout means, and wherein said first-data-group-readout second direction means includes:

a second address value from the index data by referring to the reproduction order in the reproduction order data in the channel data and finding the element data identifier in the index data that coincides with the element data identifier in the reproduction order data, the address value extracted by said first address value extraction unit being different from the address value extracted by said second address value extraction unit; and a second address indication unit for outputting the address value extracted by said second address value extraction unit to said first-data-group readout means, wherein said input manipulation means accepts instruction input as to a reproduction channel by means of a location coordinate, and wherein branch judgment data are attached to the element data identifier in the reproduction order data when the reproduction order corresponding to said element data identifier is placed last in the order and a reproduction channel for the element data identified by said element data identifier has a branching point at an end thereof, and wherein said branch judgment data include a reproduction order identifier, and a screen area data consisting of location coordinates each indicating respective locations of a plurality of video data areas, each of said plurality of video data areas corresponding to the respective reproduction order identifiers, and wherein said first-data-group readout means includes;

a branched channel judgment unit for judging within of which said screen area data the location coordinate accepted by said input manipulation means exist;

a reproduction channel determination unit for determining a reproduction channel as per the reproduction order data identified by the reproduction order identifier corresponding to the screen area data judged by said branched channel judgment unit;

a third address value extraction unit for extracting the address value from the index data by referring to the reproduction order in the reproduction order data in the channel data and finding the element data identifier in the index data that coincides with the element data identifier in the reproduction order data, the address values extracted, respectively, by said first, second, and third address value extraction units being different; and an element data readout unit for reading out the element data from said storage means using the address value extracted by said third address value extraction unit.

6. The data reproduction apparatus of claim 5, wherein said storage means further stores a second-data-group identifier that divides the element data of the second data group by certain classification, and wherein the second-data-group reproduction point group data include a reproduction point identifier, a reproduction order identifier, and location data representing a reproduction order for each reproduction point, and wherein the data-group specifying data include a reproduction point identifier and a corresponding second data group identifier, and wherein said second-data-group output judgment means includes:

a reproduction point judgment unit for judging whether the reproduction order identifier and the reproduction order of the element data outputted from said first-data-group output means coincide with the reproduction order identifier and the location data of any of the second-data-group reproduction point group data respectively, and wherein said second-data-group readout means includes:

a second-data-group reproduction-point-identifier extraction unit for extracting a reproduction point identifier coinciding with the second-data-group reproduction point group data when said reproduction point judgment means judges coincidence;

a second-data-group element data identifier selection unit for taking out the second data group identifier corresponding to the reproduction point identifier extracted by said second-data-group reproduction-point-identifier extraction unit to select an element data identifier having the second data group identifier in the index data;

a second-data-group random selection unit for selecting one element data identifier from the element data identifiers selected by said second-data-group element data identifier selection unit;

a fourth address value extraction unit for extracting the address value corresponding to the element data identifier selected by said second-data-group random selection unit from the index data; and a second-data-group readout unit for reading out the element data stored in said storage means by accessing to an address identified by the address value extracted by said fourth address value extraction unit.

7. The data reproduction apparatus of claim 6, wherein the element data of said first data group are scene files of electronic book data, and the element data of said second data group are advertisement data, the advertisement data being reproduced within a reproduction channel of the scene files.

8. A data reproduction apparatus comprising:

storage means for storing primary data and management data, said primary data being a plurality of element data, said management data including index data that divide said plurality of element data into a first data group and a second data group, and channel data that indicate a reproduction order in said first data group;

management data readout and save means for reading out and saving the index data and the channel data from said storage means;

first-data-group-readout first direction means for outputting a first readout direction to readout the element data of said first data group as per the channel data saved in said management data readout and save means;

input manipulation means for accepting instruction input for directing a selection of a reproduction channel of the element data of said first data group;

first-data-group-readout second direction means for outputting a second readout direction to readout the element data of said first data group from said storage means as per the channel data specified by the instruction input from said input manipulation means;

first-data-group readout means for reading out the element data stored in said storage means as per one of the first and second readout direction;

first-data-group reproduction means for converting the element data readout by said first-data-group readout means into reproduction data and outputting resulting reproduction data;

first-data-group output means for converting the reproduction data inputted from said first-data-group reproduction means into output data and outputting resulting output data;

second-data-group output judgment means for judging whether it is adequate to output the element data of said second data group after the element data of said direct data group being reproduced;

second-data-group readout means for reading out the element data of said second data group stored in said storage means when said second-data-group output judgment means judges adequacy of the output of the element data of said second data group;

second-data-group reproduction means for converting the element data read out by said second-data-group readout means into reproduction data and outputting resulting reproduction data;

second-data-group output means for converting the reproduction data inputted from said second-data-group reproduction means into output data and outputting resulting output data, wherein said management data further include second-data-group reproduction point group data and selection condition data, said second-data-group reproduction point group data indicating reproduction of element data of said second data group within a reproduction channel of the element data of said first data group; and said management data readout and save means further reads out and saves the second-data group reproduction point group data and the selection condition data stored in said storage means, whereby said second-data-group output judgment means judges adequacy when the element data outputted from said first-data-group output means coincide with the element data saved n said management data readout and save means;

second-data-group selection means for selecting the element data as per the selection condition data, said selection condition data being the number of the element data to be read out, and wherein said second-data-group readout means reads out the element data selected by said second-data-group selection means from said storage means, the index data include an element data identifier identifying individual element data and an address value identifying place in said storage means where each element data specified by a respective element data identifier are stored, and wherein the channel data include reproduction order data formed of a reproduction order and an element data identifier and a reproduction order identified identifying individual reproduction order data, and wherein said first-data-group-readout first direction means includes:

a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by said first address value extraction unit to said first-data-group readout means, and wherein said first-data-group-readout second direction means includes:

a second address value from the index data by referring to the reproduction order in the reproduction order data in the channel data and finding the element data identifier in the index data that coincides with the element data identifier in the reproduction order data, the address value extracted by said first address value extraction unit being different from the address value extracted by said second address value extraction unit; and a second address indication unit for outputting the address value extracted by said second address value extraction unit to said first-data-group readout means, wherein said input manipulation means accepts instruction input as to a reproduction channel by means of a location coordinate, and wherein branch judgment data are attached to the element data identifier in the reproduction order data when the reproduction order corresponding to said element data identifier is placed last in the order and a reproduction channel for the element data identified by said element data identifier has a branching point at an end thereof, and wherein said branch judgment data include a reproduction order identifier, and a screen area data consisting of location coordinates each indicating respective locations of a plurality of video data areas, each of said plurality of video data areas corresponding to the respective reproduction order identifiers, and wherein said first-data-group readout means includes;

a branched channel judgment unit for judging within of which said screen area data the location coordinate accepted by said input manipulation means exist;

a reproduction channel determination unit for determining a reproduction channel as per the reproduction order data identified by the reproduction order identifier corresponding to the screen area data judged by said branched channel judgment unit;

a third address value extraction unit for extracting the address value from the index data by referring to the reproduction order in the reproduction order data in the channel data and finding the element data identifier in the index data that coincides with the element data identifier in the reproduction order data, the address values extracted, respectively, by said first, second, and third address value extraction units being different; and an element data readout unit for reading out the element data from said storage means using the address value extracted by said third address value extraction unit.

9. The data apparatus of claim 8, wherein said second-data-group reproduction point group data include a reproduction point identifier, a reproduction order identifier, and location data representing a reproduction order, and wherein said selection condition data include a reproduction point identifier and the number of element data to be reproduced for individual reproduction point identifiers, and wherein said second-data-group output judgment means includes:

a reproduction point judgment unit for judging whether the reproduction order identifier and the reproduction order of the element data outputted form said first data group output means coincide with the reproduction order identifier and the location data of any of the second-data-group reproduction point data respectively, and wherein said second-data-group readout means includes:

a second-data-group reproduction-point-identifier extraction unit for extracting the reproduction point identifier coinciding with the second-data-group reproduction data when said reproduction point judgment unit judges coincidence;

a second-data-group reproduction number extraction unit for taking out the number of element data to be reproduced corresponding to the reproduction point identifier extracted by said second-data-group reproduction-point-identifier extraction unit from the selection condition data;

a second-data-group element data identifier random selection unit for selecting a number of element data identifiers of the element data of said second data group in the index data at random, said number matching with the number of element data to be reproduced extracted by said second-data-group reproduction number extraction unit;

a fourth address value extraction unit for successively extracting the address values corresponding to the element data identifiers of said second data group selected by said second-data-group element data identifier random selection unit from the index data, the address values extracted respectively by said first, second, third, and fourth address values extraction units being different, and a second-data-group readout unit for successively reading out the element data stored in said storage means by accessing to addresses identified by the address values extracted by said fourth address value extraction unit.

10. The data reproduction apparatus of claim 9, wherein the element data of said first data group are scene files of electronic book data, and the element data of said second data group are advertisement data, the advertisement data being reproduced within a reproduction channel of the scene files.

11. A data reproduction apparatus comprising:

storage means for storing primary data and management data, said primary data being a plurality of element data, said management data including index data that divide said plurality of element data into a first data group and a second data group, and channel data that indicate a reproduction order in said first data group;

management data readout and save means for reading out and saving the index data and the channel data from said storage means;

first-data-group-readout first direction means for outputting a first readout direction to readout the element data of said first data group as per the channel data saved in said management data readout and save means;

input manipulation means for accepting instruction input for directing a selection of a reproduction channel of the element data of said first data group;

first-data-group-readout second direction means for outputting a second readout direction to readout the element data of said first data group from said storage means as per the channel data specified by the instruction input from said input manipulation means;

first-data-group readout means for reading out the element data stored in said storage means as per one of the first and second readout direction;

first-data-group reproduction means for converting the element data readout by said first-data-group readout means into reproduction data and outputting resulting reproduction data;

first-data-group output means for converting the reproduction data inputted from said first-data-group reproduction means into output data and outputting resulting output data;

second-data-group output judgment means for judging whether it is adequate to output the element data of said second data group after the element data of said direct data group being reproduced;

second-data-group readout means for reading out the element data of said second data group stored in said storage means when said second-data-group output judgment means judges adequacy of the output of the element data of said second data group;

second-data-group reproduction means for converting the element data read out by said second-data-group readout means into reproduction data and outputting resulting reproduction data;

second-data-group output means for converting the reproduction data inputted from said second-data-group reproduction means into output data and outputting resulting output data, wherein said storage means further stores evaluation function data for individual element data of said first data group, and wherein said data reproduction apparatus further comprises:

evaluation function data readout and save means for reading and saving the evaluation function data stored in said storage means as per one of the first and second readout direction; and reproduction state detection means for detecting a reproduction time, the reproduction time being a period of time from a start to an end of reproduction for individual element data at said first data group output means;

evaluation value computation means for computing an evaluation value by substituting the reproduction time into the evaluation function data saved in said evaluation function data readout and save means;

evaluation value addition means for computing a total of the evaluation values computed by said evaluation value computation means, whereby said second-data-group output judgment means judges adequacy when the total of the evaluation values becomes greater than a predetermined threshold; and reset means for resetting the total of the evaluation values computed by said evaluation value addition means when said second-data-group output means outputs output data;

reproduction suspend/resume manipulation means for accepting a manipulation to suspend output of the output data from said first-data-group output means and outputting an output suspend command to said first-data-group output means, and for accepting a manipulation to release the output-data output suspension and outputting an output resume command to said first-data-group output means, and wherein said reproduction state detection means detects the reproduction time by including a time interval for the output suspension caused by the reproduction suspend/resume manipulation, wherein the index data include an element data identifier identifying individual element data and an address value identifying place in said storage means where each element data specified by a respective element data identifier are stored, and wherein the channel data include reproduction order data formed of a reproduction order and an element data identifier and a reproduction order identified identifying individual reproduction order data, and wherein said first-data-group-readout first direction means includes:

a first address value extraction unit for extracting the address value from the index data by referring to the reproduction order in the reproduction order data in the channel data and finding the element data identifier in the index data that coincides with the element data identifier in the reproduction order data; and a first address indication unit for outputting the address value extracted by said first address value extraction unit to said first-data-group readout means, and wherein said first-data-group-readout second direction means includes:

a second address value from the index data by referring to the reproduction order in the reproduction order data in the channel data and finding the element data identifier in the index data that coincides with the element data identifier in the reproduction order data, the address value extracted by said first address value extraction unit being different from the address value extracted by said second address value extraction unit; and a second address indication unit for outputting the address value extracted by said second address value extraction unit to said first-data-group readout means, wherein said input manipulation means accepts instruction input as to a reproduction channel by means of a location coordinate, and wherein branch judgment data are attached to the element data identifier in the reproduction order data when the reproduction order corresponding to said element data identifier is placed last in the order and a reproduction channel for the element data identified by said element data identifier has a branching point at an end thereof, and wherein said branch judgment data include a reproduction order identifier, and a screen area data consisting of location coordinates each indicating respective locations of a plurality of video data areas, each of said plurality of video data areas corresponding to the respective reproduction order identifiers, and wherein said first-data-group readout means includes;

a branched channel judgment unit for judging within of which said screen area data the location coordinate accepted by said input manipulation means exist;

a reproduction channel determination unit for determining a reproduction channel as per the reproduction order data identified by the reproduction order identifier corresponding to the screen area data judged by said branched channel judgment unit;

a third address value extraction unit for extracting the address value from the index data by referring to the reproduction order in the reproduction order data in the channel data and finding the element data identifier in the index data that coincides with the element data identifier in the reproduction order data, the address values extracted, respectively, by said first, second, and third address value extraction units being different; and an element data readout unit for reading out the element data from said storage means using the address value extracted by said third address value extraction unit.

12. The data reproduction apparatus of claim 11, wherein the evaluation function data are selected from a group consisting of an equal-plus-value evaluation function, a converge-plus-value evaluation function, an equal-minus-value evaluation function, and a converge-minus-value evaluation function depending on a content of corresponding element data.

13. The data reproduction apparatus of claim 12, wherein the element data of said first data group are scene files of electronic book data, and the element data of said second data group are advertisement data, the advertisement data being reproduced within a reproduction channel of the scene files.

14. A system for playback of electronic publishing comprising:

a delivery medium for storing primary data and management data, wherein the primary data includes a plurality of pieces of element data including at least picture data, and the management data includes index data, route data, and second data-group reproduction point data, wherein the index data classifies the plurality of pieces of element data into a first data group and a second data group, the route data indicates a reproduction route in which pieces of element data in the first data group are arranged in reproduction order with branch points, and the second-data-group reproduction point data specifies a reproduction point in the reproduction route where a piece of element data in the second data group is reproduced; and a playback apparatus for reproducing data stored in the delivery medium, wherein the playback apparatus comprises:

extracting means for extracting a certain kind of primary data and a certain kind of management data from the delivery medium;

input manipulation means for receiving a branch destination specification instruction from a user at each of the branch points in the reproduction route;

reproduction means for converting the certain kind of primary data extracted by the extracting means into a reproduction signal and outputting the reproduction signal;

output means for converting the reproduction signal output by the reproduction means into a picture signal and outputting the picture signal;

first-data-group playback control means for determining a piece of element data in the first data group to be reproduced according to the route data extracted by the extracting means and the branch destination specification instruction received by the input manipulation means, and instructing the extracting means to extract the determined piece of element data;

second-data-group output judgement means for judging based on the management data extracted by the extracting means whether a piece of element data in the second data group should be output by the output means to a position after the piece of element data output by the output means according to the second-data-group reproduction point data; and second-data-group playback control means for determining a piece of element data in the second data group to be output according to the index data in the management data extracted by the extracting means when the second-data-group output judgement means judges that the element data in the second data group should be output, and instructing the extracting means to extract the determined element data, wherein the delivery medium stores evaluation function data corresponding to each element data in the first data group, and wherein the playback apparatus further comprises:

evaluation function data extracting and holding means for extracting the evaluation function data from the delivery medium and holding the evaluation function data;

reproduction state detecting means for detecting a reproduction time for each element data in the first data group output by the output means, the reproduction time being a period from a start to an end of an output by the output means of a piece of element data in the first data group;

evaluation value calculating means for calculating an evaluation value by substituting the reproduction time detected by the reproduction state detecting means into the evaluation function data held by the evaluation function data extracting and holding means;

evaluation value adding means for adding up evaluation values calculated by the evaluation value calculating means to obtain a sum, wherein the second-data-group output judgement means compares the sum to a threshold value and judges that a piece of element data in the second data group should be output by the output means when the sum exceeds the threshold value; and reset means for resetting the sum calculated by the evaluation value adding means to an initial value when the output means outputs output data of a piece of element data in the second data group.

15. The system for playback of electronic publishing of claim 14 wherein one an equal-plus-value evaluation function, a converge-plus-value evaluation function, an equal-minus value evaluation function, and a converge-minus-value evaluation function is chosen as the evaluation function data according to contents of a corresponding piece of element data.

16. The system for playback of electronic publishing of claim 14, wherein the element data stored in the delivery medium includes scene files classified into the first data group and advertisement data classified into the second data group, wherein the scene files are reproduced according to the reproduction route and the advertisement data is reproduced at the reproduction points in the reproduction route.

17. The system for playback of electronic publishing of claim 14, wherein the delivery medium further stores second-data group reproduction point data, being management data for specifying each reproduction point with a corresponding piece of element data in the first data group in the reproduction route, and data-group specification data which is management data for specifying correspondence between each group, into which the plurality of pieces of element data in the second data group are classified by a certain criteria, and a reproduction point, wherein the extracting means further reads the second data-group reproduction data and the data-group specification data from the delivery medium, wherein the second-data-group output judging means judges that a piece of element data in the second data group should be output by the output means when the piece of element data in the first data group output by the output means agree with the second-data-group reproduction point data extracted by the extracting means, and wherein the second-data-group playback control means instructs the extracting means to extract a piece of element data in the second data group stored in the delivery medium according to the index data and the data-group specification data when the second-data-group output judging means judges that a piece of element data in the second data group should be output by the output means.

18. The system for playback of electronic publishing of claim 14, wherein the delivery medium further stores second-data-group reproduction point data, being management data for specifying each reproduction point with a corresponding piece of element data in the first data group in the reproduction route, and identification condition data which is management data for specifying the number of pieces of element data in the second data group to be reproduced at each reproduction point, wherein the extracting means further reads the second-data-group reproduction data and the identification condition data from the delivery medium, herein the second-data-group output judging means judges that a piece of element data in the second data group should be output by the output means when the piece of element data in the first data group output by the output means agree with the second-data-group reproduction point data extracted by the extracting means, and wherein the second-data-group playback control means instructs the extracting means to extract a piece of element data in the second data group stored in the delivery medium according to the index data and the identification condition data when the second-data-group output judging means judges that a piece of element data in the second data group should be output by the output means.

19. A method for playback of electronic publishing comprising:

a data obtaining step of obtaining primary data and management data from a delivery medium, wherein the primary data includes a plurality of pieces of element data including at least picture data, and the management data includes index data, route data, and second-data-group reproduction point data, wherein the index data classifies the plurality of pieces of element data into a first data group and a second data group, the route data indicates a reproduction route in which pieces of element data in the first data group are arranged in reproduction order with branch points, and the second-data-group reproduction point data specifies a reproduction point in the reproduction route where a piece of element data in the second data group is reproduced, wherein the element data stored in the delivery medium includes scene files classified into the first data group and advertisement data classified into the second data group, wherein the scene files are reproduced according to the reproduction route and the advertisement data is reproduced at the reproduction points in the reproduction route;

an input operation step of receiving a branch destination specification instruction from a user at each of the branch points in the reproduction route;

a reproduction step of converting the certain kind of primary data obtained in the data obtaining step into a reproduction signal and outputting the reproduction signal;

an output step of converting the reproduction signal output in the reproduction step into a picture signal and outputting the picture signal;

a first-data-group playback control step of determining a piece of element data in the first data group to be reproduced according to the route data obtained in the data obtaining step and the branch destination specification instruction received in the input manipulation step, and instructing the data obtaining step to extract the determined piece of element data;

a second-data-group output judgement step of judging based on the management data obtained in the data obtaining step whether a piece of element data in the second data group should be output in the output step to a position after the piece of element data output in the output step according to the second-data-group reproduction point data; and a second-data-group playback control step of determining a piece of element data in the second data group to be output according to the index data in the management data obtained in the data obtaining step when the second-data-group output judgement step judges that the element data in the second data group should be output, and instructing the data obtaining step to obtain the determined element data.

20. A system for playback of electronic publishing comprising:

a delivery medium for storing primary data and management data, wherein the primary data includes a plurality of pieces of element data including at least picture data, and the management data includes index data, route data, and second data-group reproduction point data, wherein the index data classifies the plurality of pieces of element data into a first data group and a second data group, the route data indicates a reproduction route in which pieces of element data in the first data group are arranged in reproduction order with branch points, and the second-data-group reproduction point data specifies a reproduction point in the reproduction route where a piece of element data in the second data group is reproduced; and a playback apparatus for reproducing data stored in the delivery medium, wherein the playback apparatus comprises:

extracting means for extracting a certain kind of primary data and a certain kind of management data from the delivery medium;

input manipulation means for receiving a branch destination specification instruction from a user at each of the branch points in the reproduction route;

reproduction means for converting the certain kind of primary data extracted by the extracting means into a reproduction signal and outputting the reproduction signal;

output means for converting the reproduction signal output by the reproduction means into a picture signal and outputting the picture signal;

first-data-group playback control means for determining a piece of element data in the first data group to be reproduced according to the route data extracted by the extracting means and the branch destination specification instruction received by the input manipulation means, and instructing the extracting means to extract the determined piece of element data;

second-data-group output judgement means for judging based on the management data extracted by the extracting means whether a piece of element data in the second data group should be output by the output means to a position after the piece of element data output by the output means according to the second-data-group reproduction point data;

second-data-group playback control means for determining a piece of element data in the second data group to be output according to the index data in the management data extracted by the extracting means when the second-data-group output judgement means judges that the element data in the second data group should be output, and instructing the extracting means to extract the determined element data; and evaluation function data extracting and holding means for extracting the evaluation function data from the delivery medium and holding the evaluation function data, wherein one of an equal-plus-value evaluation function, a converge-plus-value evaluation function, and a converge-minus-value evaluation function is chosen as the evaluation function data according to contents of a corresponding piece of element data.

21. The system for playback of electronic publishing of claim 20, wherein the playback apparatus further comprises:

reproduction pause/resume manipulation means for outputting an instruction to the reproduction means instructing the reproduction means to stop outputting a piece of element data in the first data group when the output means stops outputting output data of a piece of element data in the first data group according to a user operation, and outputting an instruction to the reproduction means instructing the reproduction means to resume outputting the piece of element data in the first data group when the output means resumes outputting output data of the piece of element data in the first data group according to a user operation, wherein the reproduction state detecting means detects a period during which the output means stops outputting output data of a piece of element data in the first data group according to an operation of the reproduction pause/resume manipulation means and includes the period in the reproduction time.

22. A system for playback of electronic publishing comprising:

a delivery medium for storing primary data and management data, wherein the primary data includes a plurality of pieces of element data including at least picture data, and the management data includes index data, route data, and second data-group reproduction point data, wherein the index data classifies the plurality of pieces of element data into a first data group and a second data group, the route data indicates a reproduction route in which pieces of element data in the first data group are arranged in reproduction order with branch points, and the second-data-group reproduction point data specifies a reproduction point in the reproduction route where a piece of element data in the second data group is reproduced; and a playback apparatus for reproducing data stored in the delivery medium, wherein the playback apparatus comprises:

extracting means for extracting a certain kind of primary data and a certain kind of management data from the delivery medium;

input manipulation means for receiving a branch destination specification instruction from a user at each of the branch points in the reproduction route;

reproduction means for converting the certain kind of primary data extracted by the extracting means into a reproduction signal and outputting the reproduction signal;

output means for converting the reproduction signal output by the reproduction means into a picture signal and outputting the picture signal;

first-data-group playback control means for determining a piece of element data in the first data group to be reproduced according to the route data extracted by the extracting means and the branch destination specification instruction received by the input manipulation means, and instructing the extracting means to extract the determined piece of element data;

second-data-group output judgement means for judging based on the management data extracted by the extracting means whether a piece of element data in the second data group should be output by the output means to a position after the piece of element data output by the output means according to the second-data-group reproduction point data; and second-data-group playback control means for determining a piece of element data in the second data group to be output according to the index data in the management data extracted by the extracting means when the second-data-group output judgement means judges that the element data in the second data group should be output, and instructing the extracting means to extract the determined element data, wherein the element data stored in the delivery medium includes scene files classified into the first data group and advertisement data classified into the second data group, wherein the scene files are reproduced according to the reproduction route and the advertisement data is reproduced at the reproduction points in the reproduction route.

23. The system for playback of electronic publishing of claim 22, wherein the playback apparatus further comprises:

second-data-group reproduction history record means for recording an element data identifier which is used to identify the piece of element data in the second data group output by the output means; and second-data-group selection means for taking a priority in selecting a piece of element data except the piece of element data identified by the element data identifier recorded in the second-data-group reproduction history record means, wherein the extracting means extracts from the delivery medium the piece of element data selected by the second-data-group selection means.

24. A system for playback of electronic publishing comprising:

a delivery medium for storing primary data and management data, wherein the primary data includes a plurality of pieces of element data including at least picture data, and the management data includes index data, route data, and second data-group reproduction point data, wherein the index data classifies the plurality of pieces of element data into a first data group and a second data group, the route data indicates a reproduction route in which pieces of element data in the first data group are arranged in reproduction order with branch points, and the second-data-group reproduction point data specifies a reproduction point in the reproduction route where a piece of element data in the second data group is reproduced; and a playback apparatus for reproducing data stored in the delivery medium, wherein the playback apparatus comprises:

extracting means for extracting a certain kind of primary data and a certain kind of management data from the delivery medium;

input manipulation means for receiving a branch destination specification instruction from a user at each of the branch points in the reproduction route;

reproduction means for converting the certain kind of primary data extracted by the extracting means into a reproduction signal and outputting the reproduction signal;

output means for converting the reproduction signal output by the reproduction means into a picture signal and outputting the picture signal;

first-data-group playback control means for determining a piece of element data in the first data group to be reproduced according to the route data extracted by the extracting means and the branch destination specification instruction received by the input manipulation means, and instructing the extracting means to extract the determined piece of element data;

second-data-group output judgement means for judging based on the management data extracted by the extracting means whether a piece of element data in the second data group should be output by the output means to a position after the piece of element data output by the output means according to the second-data-group reproduction point data; and second-data-group playback control means for determining a piece of element data in the second data group to be output according to the index data in the management data extracted by the extracting means when the second-data-group output judgement means judges that the element data in the second data group should be output, and instructing the extracting means to extract the determined element data, wherein the delivery medium further stores second-data group reproduction point data, being management data for specifying each reproduction point with a corresponding piece of element data in the first data group in the reproduction route and data-group specification data which is management data for specifying correspondence between each group, into which the plurality of pieces of element data in the second data group are classified by a certain criteria, and a reproduction point, wherein the extracting means further reads the second data-group reproduction data and the data-group specification data from the delivery medium, wherein the second-data-group output judging means judges that a piece of element data in the second data group should be output by the output means when the piece of element data in the first data group output by the output means agrees with the second-data-group reproduction point data extracted by the extracting means, and wherein the second-data-group playback control means instructs the extracting means to extract a piece of element data in the second data group stored in the delivery medium according to the index data and the data-group specification data when the second-data-group output judging means judges that a piece of element data in the second data group should be output by the output means.

25. A system for playback of electronic publishing comprising:

a delivery medium for storing primary data and management data, wherein the primary data includes a plurality of pieces of element data including at least picture data, and the management data includes index data, route data, and second data-group reproduction point data, wherein the index data classifies the plurality of pieces of element data into a first data group and a second data group, the route data indicates a reproduction route in which pieces of element data in the first data group are arranged in reproduction order with branch points, and the second-data-group reproduction point data specifies a reproduction point in the reproduction route where a piece of element data in the second data group is reproduced; and a playback apparatus for reproducing data stored in the delivery medium, wherein the playback apparatus comprises:

extracting means for extracting a certain kind of primary data and a certain kind of management data from the delivery medium;

input manipulation means for receiving a branch destination specification instruction from a user at each of the branch points in the reproduction route;

reproduction means for converting the certain kind of primary data extracted by the extracting means into a reproduction signal and outputting the reproduction signal;

output means for converting the reproduction signal output by the reproduction means into a picture signal and outputting the picture signal;

first-data-group playback control means for determining a piece of element data in the first data group to be reproduced according to the route data extracted by the extracting means and the branch destination specification instruction received by the input manipulation means, and instructing the extracting means to extract the determined piece of element data;

second-data-group output judgement means for judging based on the management data extracted by the extracting means whether a piece of element data in the second data group should be output by the output means to a position after the piece of element data output by the output means according to the second-data-group reproduction point data; and second-data-group playback control means for determining a piece of element data in the second data group to be output according to the index data in the management data extracted by the extracting means when the second-data-group output judgement means judges that the element data in the second data group should be output, and instructing the extracting means to extract the determined element data, wherein the delivery medium further stores second-data-group reproduction point data, being management data for specifying each reproduction point with a corresponding piece of element data in the first data group in the reproduction route, and identification condition data which is management data for specifying the number of pieces of element data in the second data group to be reproduced at each reproduction point, wherein the extracting means further reads the second-data-group reproduction data and the identification condition data from the delivery medium, wherein the second-data-group output judging means judges that a piece of element data in the second data group should be output by the output means when the piece of element data in the first data group output by the output means agree with the second-data-group reproduction point data extracted by the extracting means, and wherein the second-data-group playback control means instructs the extracting means to extract a piece of element data in the second data group stored in the delivery medium according to the index data and the identification condition data when the second-data-group output judging means judges that a piece of element data in the second data group should be output by the output means.

* * * * *